(12) United States Patent
Denton et al.

(10) Patent No.: US 10,970,303 B1
(45) Date of Patent: Apr. 6, 2021

(54) SELECTING RESOURCES HOSTED IN DIFFERENT NETWORKS TO PERFORM QUERIES ACCORDING TO AVAILABLE CAPACITY

(71) Applicant: Amazon Technologies, Inc., Seattle, WA (US)

(72) Inventors: Jason Douglas Denton, Seattle, WA (US); Rahul Sharma Pathak, Seattle, WA (US); Xing Wu, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 256 days.

(21) Appl. No.: 15/668,677

(22) Filed: Aug. 3, 2017

(51) Int. Cl.
  *G06F 16/00* (2019.01)
  *G06F 16/27* (2019.01)
  *G06F 16/951* (2019.01)
  *G06F 16/25* (2019.01)

(52) U.S. Cl.
  CPC ............ *G06F 16/27* (2019.01); *G06F 16/951* (2019.01); *G06F 16/254* (2019.01)

(58) Field of Classification Search
  CPC .................................................. G06F 16/27
  USPC .................. 707/770, 683, 224, 226; 709/224
  See application file for complete search history.

(56) References Cited

U.S. PATENT DOCUMENTS

| | | | |
|---|---|---|---|
| 6,076,092 A * | 6/2000 | Goldberg | G06F 16/252 707/683 |
| 6,466,980 B1 | 10/2002 | Lumelsky et al. | |
| 6,950,821 B2 | 9/2005 | Faybishenko et al. | |
| 7,209,915 B1 | 4/2007 | Taboada et al. | |
| 7,590,746 B2 * | 9/2009 | Slater | H04L 41/0896 709/226 |
| 8,296,419 B1 * | 10/2012 | Khanna | H04L 67/1029 709/224 |
| 8,370,481 B2 * | 2/2013 | Wilson | H04L 41/5054 709/224 |

OTHER PUBLICATIONS

U.S. Appl. No. 15/470,834, filed Mar. 27, 2017, Maru, et al.
U.S. Appl. No. 15/470,829, filed Mar. 27, 2017, Kalathuru, et al.

* cited by examiner

*Primary Examiner* — Chelcie L Daye
(74) *Attorney, Agent, or Firm* — Robert C. Kowert; Kowert, Hood, Munyon, Rankin & Goetzel, P.C.

(57) ABSTRACT

Available capacity of resources hosted in different networks may be evaluated to select resources for the performance of a query. A query may be received via an interface for one network. The available capacity of the one network and other networks may be evaluated to select resources hosted in another network to perform the query instead of the resources in the one network. The query may then be routed to the resources in the other network and result of the query performed at the resources in the other network provided.

20 Claims, 14 Drawing Sheets

SELECTING RESOURCES HOSTED IN DIFFERENT NETWORKS TO PERFORM QUERIES ACCORDING TO AVAILABLE CAPACITY

BACKGROUND

Computing systems for querying of large sets of data can be extremely difficult to implement and maintain. In many scenarios, for example, it is necessary to first create and configure the infrastructure (e.g. server computers, storage devices, networking devices, etc.) to be used for the querying operations. It might then be necessary to perform extract, transform, and load ("ETL") operations to obtain data from a source system and place the data in data storage. It can also be complex and time consuming to install, configure, and maintain the database management system ("DBMS") that performs the query operations. Moreover, many DBMS are not suitable for querying extremely large data sets in a performant manner.

Computing clusters can be utilized in some scenarios to query large data sets in a performant manner. For instance, a computing cluster can have many nodes that each execute a distributed query framework for performing distributed querying of a large data set. Such computing clusters and distributed query frameworks are, however, also difficult to implement, configure, and maintain. Therefore full utilization of available computing clusters may be desirable.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of selecting resources to perform queries hosted in different networks according to available capacity are described herein. Computing resources for performing queries may be hosted in different locations in order to provide resources for performing queries close to the data or users that submit the queries, in some embodiments. For instance, different networks may host different collections or groups of resources that may be utilized to service queries received at the different networks, in one embodiment. Utilization of the resources in the different networks may not always be balanced, in some scenarios. Failure events, for example, may cause the resources in one network to be unavailable for performing queries, in one embodiment. Selecting resources to perform queries hosted in different networks according to available capacity may allow for queries to be dynamically routed to optimal or available locations to perform queries, in some embodiments. In this way, resources across the different networks may be better utilized, reducing waste, in various embodiments.

Figure 1:
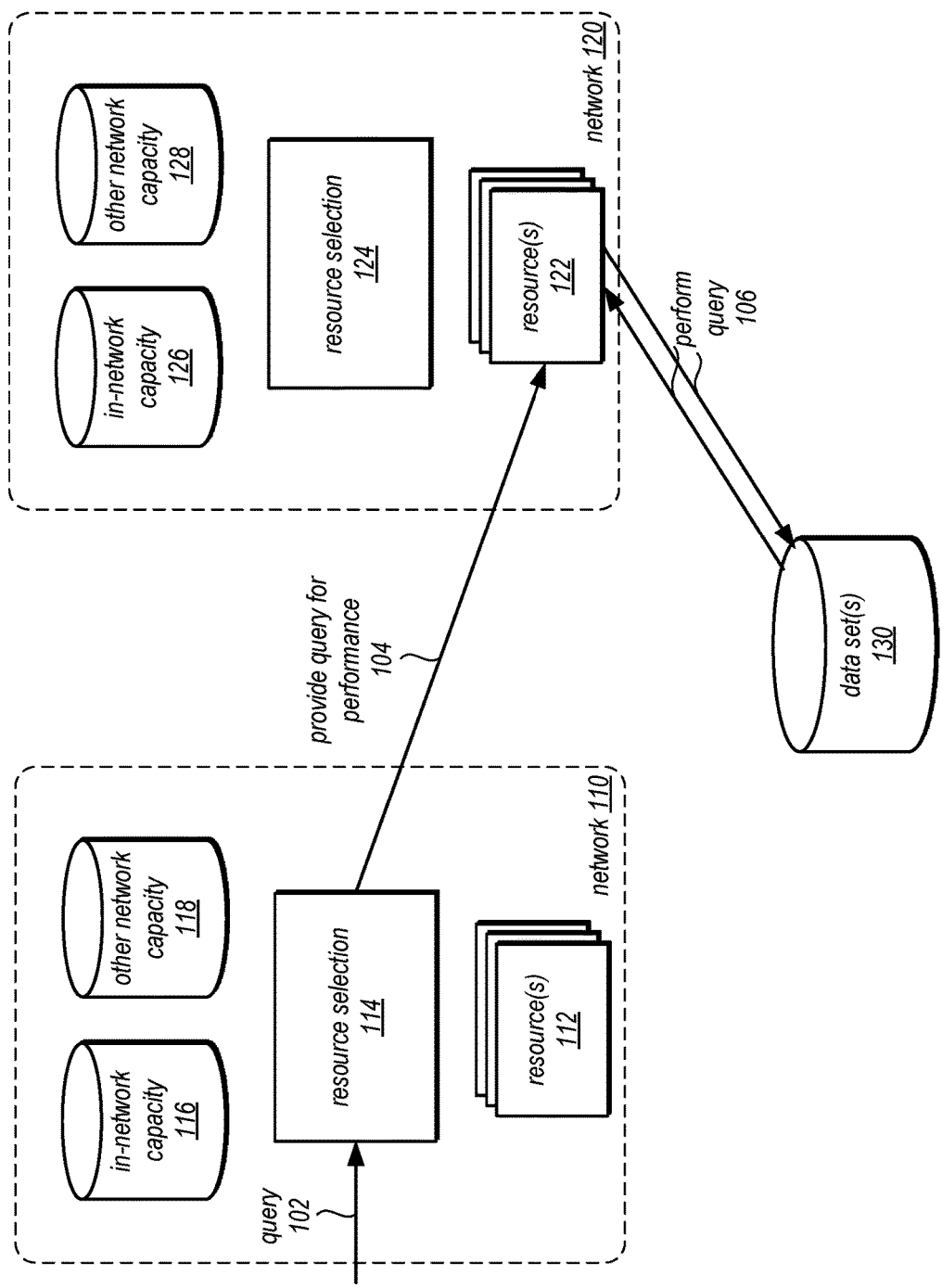
FIG. 1 illustrates a logical block diagram of selecting resources to perform queries hosted in different networks according to available capacity, according to some embodiments.

FIG. 1 illustrates a logical block diagram of selecting resources to perform queries hosted in different networks according to available capacity, according to some embodiments. Resources, such as resources 112 and 114, may be one or more computing resources that may be or include one or more nodes, instances, hosts, or other collections of computing resources (e.g., a cluster of computing resources) that implement a query engine, or other query processing framework for performing queries with respect to data set(s) 130 (e.g., that may be remotely stored), in one embodiment. Resources 112 and 114 may be differently configured, in at least some embodiments, providing opportunities to offer different execution engines, platforms, services, or systems for queries. For example, a query engine on resources 112 may be a query engine that processes relational database requests (e.g., Structured Query Language (SQL) queries), while query engine on resources 122 may be a non-relational data store that processes scans or other operations for objects based key values, in one embodiment.

Resources may be hosted within different networks, such as network 110 and network 120. In at least some embodiments, networks 110 and 120 may be private networks which may only be able to communicate over a public network, such as a wide area network like the Internet (even in scenarios where both of the private networks are controlled or operated by the same entity, such as provider network regions discussed below with regard to FIG. 2).

A query 102 may be received that directed to a data set 130, in some embodiments. Query 102 may be received via various types of interfaces (programmatic, user console, driver, etc.), in one embodiment, for network 110. A query may be formatted according to different query languages, or specifications of query languages including Structured Query Language (SQL) and/Hive Query Language (HQL), for relational data stores, APIs or other requests for non-relational data sets, or queries for other types of other types of schemas structures (or unstructured) data sets. The query may include execution hints, specifying the type of query execution engine(s) to utilize, query execution limits, or other parameters or properties for configuring the execution of the query, in some embodiments. Data set(s) 130 be one or more data objects (e.g., database table), or other data structures that store data that may be accessed by a query 102, in various embodiments.

Resource selection 114 may be implemented as part of network 110 to identify which resource(s) should perform the query. The selection of resources may be based on an evaluation of the available capacity of in-network resources 116 and other network resources 118, as discussed below with regard to FIGS. 9 and 10. For example, resource selection 114 may check to see if any available capacity within network 110 exists to process query 102 by evaluating in-network capacity 116. In some embodiments, the type, configuration, and number of resources to perform a query may be identified and the selection computing resources whether in network 110 or network 120 may be based on the available capacity of network 110 or network 120 to perform the query with resources that match or satisfy the identified type, configuration, and/or number. As illustrated in FIG. 1, resource selection 114 may select resource (s) 122 in network 120 instead of resources 112 in network 110 to perform the query. They query may be provided 104 to and otherwise caused to be performed 106 by resources 122 in network 120, in some embodiments.

Similarly, although not illustrated, network 120 may implement resource selection 124 which may select resources to process a query based on an evaluation of in-network capacity 126 and other network capacity 128. In this way, both networks may dynamically route queries to find optimal performance at available resources and/or avoid delays due to lack of in network capacity or sub-optimal capacity, in some embodiments. Capacity information may be collected, tracked, maintained, or updated in various ways, such as by utilizing gossip-based protocols to communicate capacity state amongst networks as discussed below with regard to FIG. 7.

Please note that the previous description of selecting resources to perform queries hosted in different networks according to available capacity is a logical illustration and thus is not to be construed as limiting as to the implementation of resources, data sets, networks, or resource selection techniques.

This specification begins with a general description of a provider network that implements different provider network regions that include a managed query service. The managed query service or resource management service in a provider network region may select resources within a provider network region or in another provider network region in order to perform queries received at the managed query service. A cross-region resource sharing service may be implemented as part of the provider network to obtain available capacity of other provider network regions in order for the selection of resources, in some embodiments. Then various examples of the managed query service and cross region resource management service (along with other services that may be utilized or implemented) including different components/modules, or arrangements of components/module that may be employed as part of implementing the services are discussed. A number of different methods and techniques to implement selecting resources to perform queries hosted in different networks according to available capacity are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
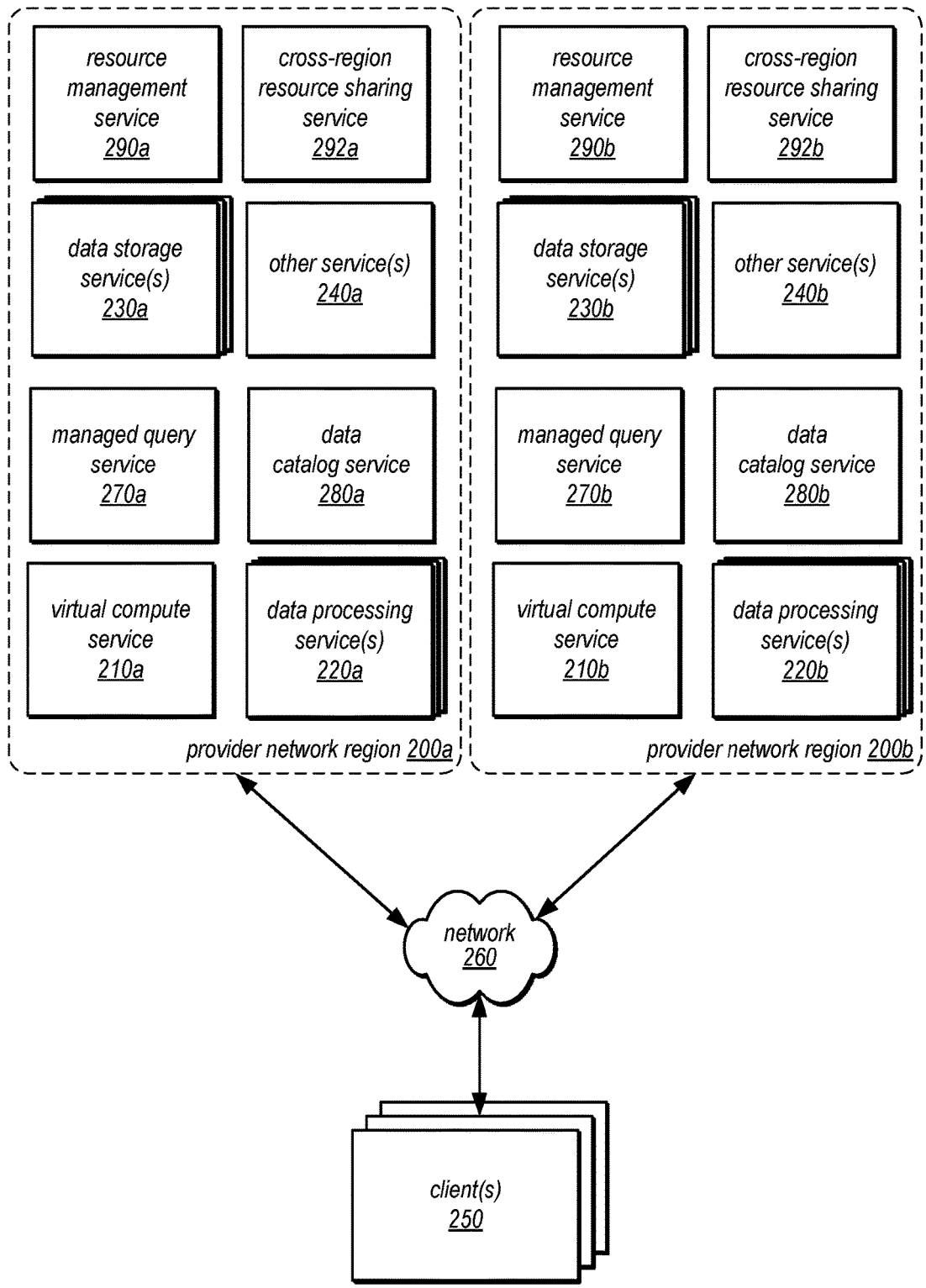
FIG. 2 is a logical block diagram illustrating provider network regions offering a managed query service that can select resources to perform queries hosted in different networks, according to some embodiments.

FIG. 2 is a logical block diagram illustrating provider network regions offering a managed query service that can select resources to perform queries hosted in different networks, according to some embodiments. A provider network may be a private or closed system or may be set up by an entity such as a company or a public sector organization to provide one or more services (such as various types of cloud-based storage) accessible via the Internet and/or other networks to clients 250, in some embodiments. The provider network may be implemented in a single location or may include numerous provider network regions, such as provider network regions 200a, 200b, and so on, that may include one or more data centers hosting various resource pools, such as collections of physical and/or virtualized computer servers, storage devices, networking equipment and the like (e.g., FIGS. 12, 13 and computing system 2000 described below with regard to FIG. 14), needed to implement and distribute the infrastructure and storage services offered by the provider network within the provider network regions 200. Provider network regions 200 may, in some embodiments, be isolated from other provider network regions In some embodiments, provider network regions may implement various computing resources or services, such as a virtual compute services 210a and 210b, data processing service(s) 220a and 220b, (e.g., relational or non-relational (NoSQL) database query engines, map reduce processing, data flow processing, and/or other large scale data processing techniques), data storage service(s) 230a and 230b, (e.g., an object storage service, block-based storage service, or data storage service that may store different types of data for centralized access) other services 240*a* and 240*b* (any other type of network based services (which may include various other types of storage, processing, analysis, communication, event handling, visualization, and security services not illustrated), managed query service 270*a* and 270*b*, data catalog service 280*a* and 280*b*, resource management service 290*a* and 290*b*, and cross-region resource sharing service 292*a* and 292*b*.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 14 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Virtual compute service 210 may be implemented by provider network regions 200, in some embodiments. Virtual computing service 210 may offer instances and according to various configurations for client(s) 250 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances and of provider network regions 200 in different embodiments, including general purpose or special purpose computer servers, storage devices, network devices and the like. In some embodiments instance client(s) 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client (s) 250 applications, without for example requiring the client(s) 250 to access an instance. Applications (or other software operated/implemented by a compute instance and may be specified by client(s), such as custom and/or off-the-shelf software.

In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc . . . and (in the case of reserved compute instances) reservation term length. Different configurations of compute instances, as discussed below with regard to FIG. 3, may be implemented as computing resources associated in different pools of resources managed by resource management service 290 for executing jobs routed to the resources, such as queries routed to select resources by managed query service 270.

Data processing services 220 may be various types of data processing services to perform different functions (e.g., query or other processing engines to perform functions such as anomaly detection, machine learning, data lookup, or any other type of data processing operation). For example, in at least some embodiments, data processing services 230 may include a map reduce service that creates clusters of processing nodes that implement map reduce functionality over data stored in one of data storage services 240. Various other distributed processing architectures and techniques may be implemented by data processing services 230 (e.g., grid computing, sharding, distributed hashing, etc.). Note that in some embodiments, data processing operations may be implemented as part of data storage service(s) 230 (e.g., query engines processing requests for specified data). Data processing service(s) 230 may be clients of data catalog service 220 in order to obtain structural information for performing various processing operations with respect to data sets stored in data storage service(s) 230, as provisioned resources in a pool for managed query service 270.

Data catalog service 280 may provide a catalog service that ingests, locates, and identifies data and the schema of data stored on behalf of clients in provider network 200 in data storage services 230. For example, a data set stored in a non-relational format may be identified along with a container or group in an object-based data store that stores the data set along with other data objects on behalf of a same customer or client of provider network 200. In at least some embodiments, data catalog service 280 may direct the transformation of data ingested in one data format into another data format. For example, data may be ingested into data storage service 230 as single file or semi-structured set of data (e.g., JavaScript Object Notation (JSON)). Data catalog service 280 may identify the data format, structure, or any other schema information of the single file or semi-structured set of data. In at least some embodiments, the data stored in another data format may be converted to a different data format as part of a background operation (e.g., to discover the data type, column types, names, delimiters of fields, and/or any other information to construct the table of semi-structured data in order to create a structured version of the data set). Data catalog service 280 may then make the schema information for data available to other services, computing devices, or resources, such as computing resources or clusters configured to process queries with respect to the data, as discussed below with regard to FIGS. 3-8. Data catalog service 280 may, in various embodiments collect, determine, maintain, obtain or otherwise store statistics on data sets, such as number of rows in a data object (e.g., table), number of storage units (e.g., blocks) for a data object, average size of data within the data object (e.g., row length), data distribution (e.g., histograms), data selectivity or density, and so on.

Data storage service(s) 230 may implement different types of data stores for storing, accessing, and managing data on behalf of clients 250 as a network-based service that enables clients 250 to operate a data storage system in a cloud or network computing environment. For example, data storage service(s) 230 may include various types of database storage services (both relational and non-relational) for storing, querying, and updating data. Such services may be enterprise-class database systems that are highly scalable and extensible. Queries may be directed to a database in data storage service(s) 230 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

One data storage service 230 may be implemented as a centralized data store so that other data storage services may access data stored in the centralized data store for processing and or storing within the other data storage services, in some embodiments. A may provide storage and access to various kinds of object or file data stores for putting, updating, and getting various types, sizes, or collections of data objects or files. Such data storage service(s) 230 may be accessed via programmatic interfaces (e.g., APIs) or graphical user interfaces. A centralized data store may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In at least some embodiments, one of data storage service(s) 230 may be a data warehouse service that utilizes a centralized data store implemented as part of another data storage service 230. A data warehouse service as may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

Managed query service 270, as discussed below in more detail with regard to FIGS. 3-6, may manage the execution of queries on behalf of clients so that clients may perform queries over data stored in one or multiple locations (e.g., in different data storage services, such as an object store and a database service) without configuring the resources to execute the queries, in various embodiments. Resource management service 290, as discussed in more detail below, may manage and provide pools of computing resources for different services like managed query service 270 in order to execute jobs on behalf the different services, as discussed above with regard to FIG. 1. Cross-region resource sharing service 292, as discussed in more detail below with regard to FIG. 7, may collect and provide the available capacity of resources hosted in other provider network regions for performing queries received at a different region, in some embodiments. Queries may be received that are directed to one service (e.g., managed query service 270) or to data stored or accessed by multiple services (e.g., processing services 220 and/or data storage service(s) 230), in some embodiments.

Generally speaking, clients 250 may encompass any type of client configurable to submit network-based requests to provider network regions 200 via network 260, including requests for storage services (e.g., a request to create, read, write, obtain, or modify data in data storage service(s) 240, etc.) or managed query service 270 (e.g., a request to query data in a data set stored in one or more of data storage service(s) 230). For example, a given client 250 may include a suitable version of a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of storage resources in data storage service(s) 240 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network regions 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment.

Clients 250 may convey network-based services requests (e.g., queries or other access requests directed to data in data storage service(s) 230, operations, tasks, or jobs, being performed as part of data processing service(s) 230, or to interact with data catalog service 220) to and receive responses from provider network regions 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network regions 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network regions 200. It is noted that in some embodiments, clients 250 may communicate with provider network regions 200 using a private network rather than the public Internet.

Figure 3:
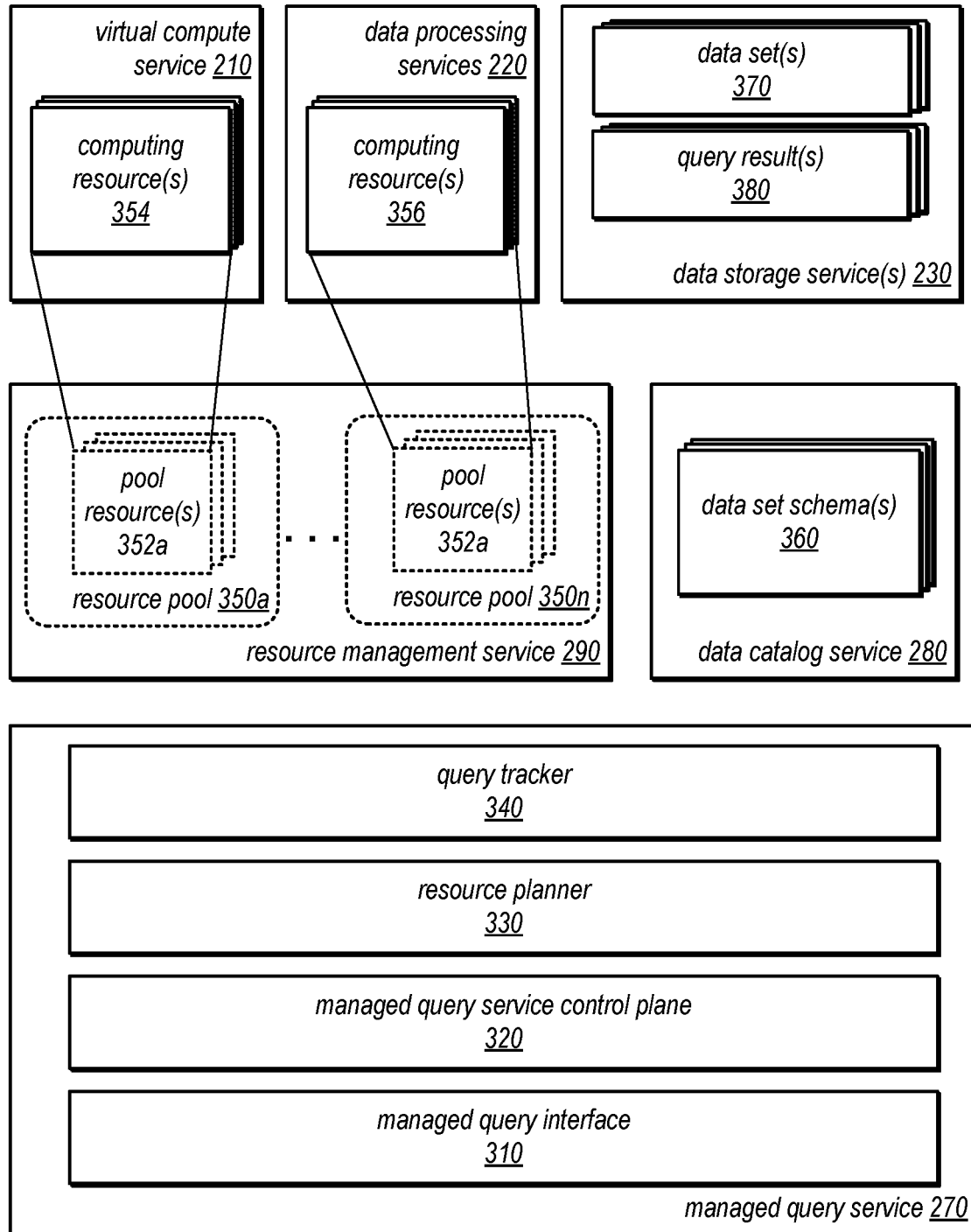
FIG. 3 is a logical block diagram illustrating a managed query service, according to some embodiments.

FIG. 3 is a logical block diagram illustrating a managed query service, according to some embodiments. As discussed below with regard to FIGS. 4-8, managed query service 270 may leverage the capabilities of various other services in a provider network region 200. For example, managed query service 270 may utilize resource management service 290 to provision and manage pools of preconfigured resources to execute queries, provide resources of preconfigured queries, and return utilized resources to availability. For example, resource management service 290 may instantiate, configure, and provide resource pool(s) 350a and 350n that include pool resource(s) 352a and 352n from one or more different resource services, such as computing resource(s) 354 in virtual compute service 210 and computing resource(s) 356 in data processing service(s) 220. Resource management service 290 may send requests to create, configure, tag (or otherwise associate) resources 352 for a particular resource pool, terminate, reboot, otherwise operate resources 352 in order to execute jobs on behalf of other network-based services. Resource management service 290 may evaluate and determine when available capacity of resources in pools of other regions 200 as may be obtained by cross-region resource sharing service should be selected to perform queries, in some embodiments.

Once a resource from a pool is provided (e.g., by receiving an identifier or other indicator of the resource to utilize), managed query service 270 may interact directly with the resource 354 in virtual compute service 210 or the resource 356 in data processing services 220 to execute queries, in various embodiments. Managed query service 270 may utilize data catalog service 280, in some embodiments to store data set schemas 352, as discussed below with regard to FIG. 4, for subsequent use when processing queries, as discussed below with regard to FIGS. 5-8, in some embodiments. For example, a data set schema may identify the field or column data types of a table as part of a table definition so that a query engine (executing on a computing resource), may be able to understand the data being queried, in some embodiments. Managed query service 270 may also interact with data storage service(s) 230 to directly source data sets 370 or retrieve query results 380, in some embodiments.

Managed query service 270 may implement a managed query interface 310 to handle requests from different client interfaces, as discussed below with regard to FIG. 4. For example, different types of requests, such as requests formatted according to an Application Programmer Interface (API), standard query protocol or connection, or requests received via a hosted graphical user interface implemented as part of managed query service may be handled by managed query interface 310.

Managed query service 270 may implement managed query service control plane 320 to manage the operation of service resources (e.g., request dispatchers for managed query interface 310, resource planner workers for resource planner 330, or query tracker monitors for query tracker 340). Managed query service control plane 320 may direct requests to appropriate components as discussed below with regard to FIG. 5. Managed query service 270 may implement authentication and authorization controls for handling requests received via managed query interface 310. For example, managed query service control plane 320 may validate the identity or authority of a client to access the data set identified in a query received from a client (e.g., by validating an access credential). In at least some embodiments, managed query service control plane 320 may maintain (in an internal data store or as part of a data set in an external data store, such as in one of data storage service(s) 230), query history, favorite queries, or query execution logs, and other managed query service historical data. Query execution costs may be billed, calculated or reported by managed query service control plane 320 to a billing service (not illustrated) or other system for reporting usage to users of managed query service, in some embodiments.

Managed query service 270 may implement resource planner 330 to intelligently select available computing resources from pools for execution of queries, in some embodiments. For example, resource planner 330 may evaluated collected data statistics associated with query execution (e.g., reported by computing resources) and determine an estimated number or configuration of computing resources for executing a query within some set of parameters (e.g., cost, time, etc.). For example, machine learning techniques may be applied by resource planner 330 to generate a query estimation model that can be applied to the features of a received query to determine the number/configuration of resources, in one embodiment. Resource planner 330 may then provide or identify which ones of the resources available to execute the query from a pool that may best fit the estimated number/configuration, in one embodiment.

In various embodiments, managed query service 270 may implement query tracker 340 in order to manage the execution of queries at compute clusters, track the status of queries, and obtain the resources for the execution of queries from resource management service 290. For example, query tracker 340 may maintain a database or other set of tracking information based on updates received from different managed query service agents implemented on provisioned computing resources (e.g., computing clusters as discussed below with regard to FIGS. 5-6).

Figure 4:
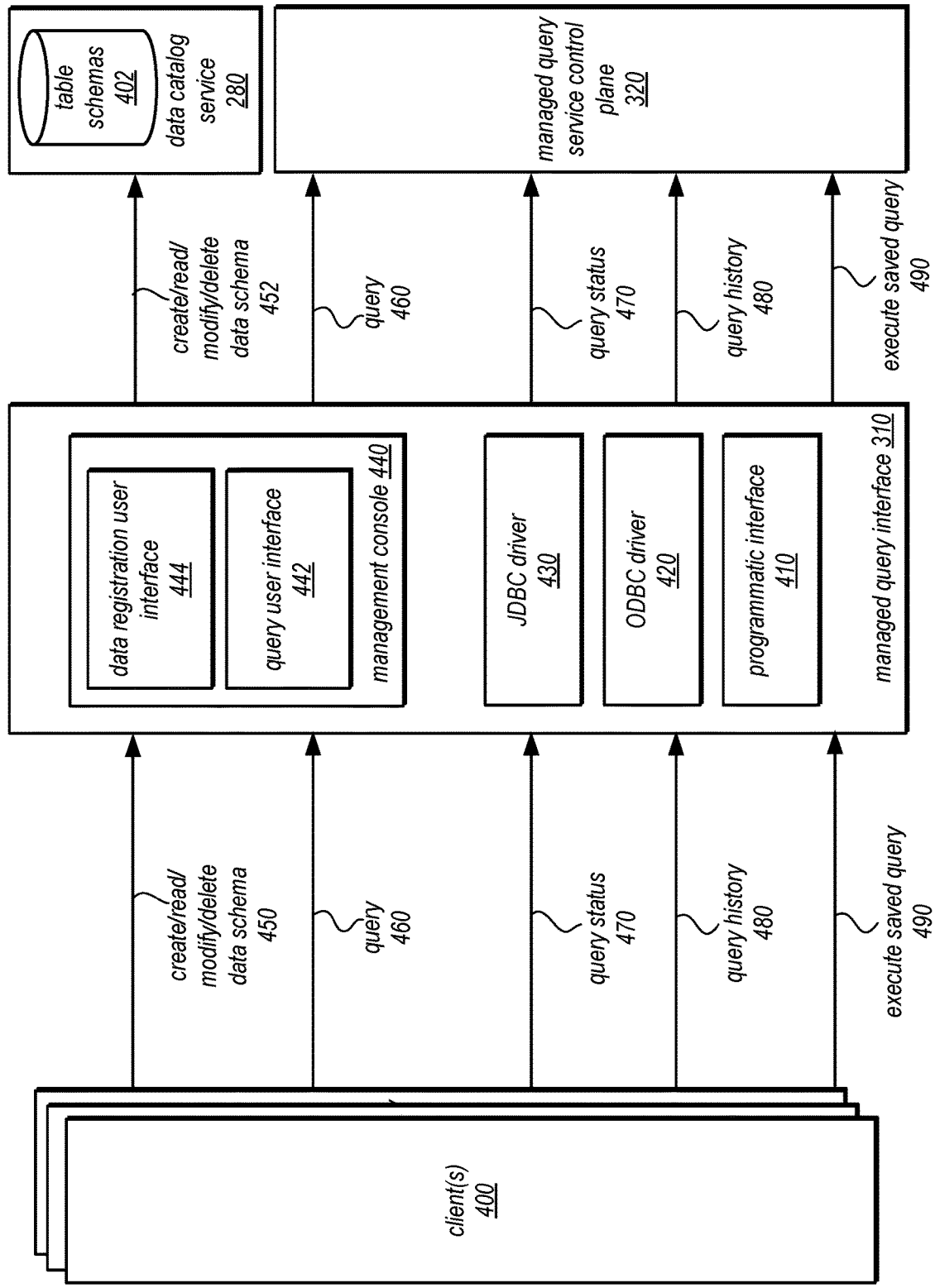
FIG. 4 is a diagram illustrating interactions between clients and managed query service, according to some embodiments.

FIG. 4 is a diagram illustrating interactions between clients and managed query service, according to some embodiments. Client(s) 400 may be client(s) 250 in FIG. 2 above or other clients (e.g., other services systems or components implemented as part of provider network regions 200 or as part of an external service, system, or component, such as data exploration or visualization tools (e.g., Tableau, Looker, MicroStrategy, Qliktech, or Spotfire). Clients 400 can send various requests to managed query service 270 via managed query interface 310. Managed query interface 310 may offer a management console 440, which may provide a user interface to submit queries 442 (e.g., graphical or command line user interfaces) or register data schemas 444 for executing queries. For example, management console 440 may be implemented as part of a network-based site (e.g., an Internet website for provider network 200) that provides various graphical user interface elements (e.g., text editing windows, drop-down menus, buttons, wizards or workflows) to submit queries or register data schemas. Managed query interface 310 may implement programmatic interfaces 410 (e.g., various Application Programming Interface (API) commands) to perform queries, and various other illustrated requests. In some embodiments, managed query interface 310 may implement custom drivers that support standard communication protocols for querying data, such as JDBC driver 430 or ODBC driver 420.

Clients 400 can submit many different types of request to managed query interface 310. For example, in one embodiment, clients 400 can submit requests 450 to create, read, modify, or delete data schemas. For example, a new table schema can be submitted via a request 450. Request 450 may include a name of the data set (e.g., table), a location of the data set (e.g. an object identifier in an object storage service, such as data storage service 230, file path, uniform resource locator, or other location indicator), number of columns, column names, data types for fields or columns (e.g., string, integer, Boolean, timestamp, array, map, custom data types, or compound data types), data format (e.g., formats including, but not limited to, JSON, CSV, AVRO, ORC, PARQUET, tab delimited, comma separated, as well as custom or standard serializers/desrializers), partitions of a data set (e.g., according to time, geographic location, or other dimensions), or any other schema information for process queries with respect to data sets, in various embodiments. In at least some embodiments, request to create/read/modify/delete data set schemas may be performed using a data definition language (DDL), such as Hive Query Language (HQL). Managed query interface 310 may perform respective API calls or other requests 452 with respect to data catalog service 280, to store the schema for the data set (e.g., as part of table schemas 402). Table schemas 402 may be stored in different formats (e.g., Apache Hive). Note, in other embodiments, managed query service 270 may implement its own metadata store.

Clients 400 may also send queries 460 and query status 470 requests to managed query interface 310 which may direct those requests 460 and 470 to managed query service control plane 320, in various embodiments, as discussed below with regard to FIG. 5. Queries 460 may be formatted according to various types of query languages, such as Structured Query Language (SQL) or HQL.

Client(s) 400 may also submit requests for query history 480 or other account related query information (e.g., favorite or common queries) which managed query. In some embodiments, client(s) 400 may programmatically trigger the performance of past queries by sending a request to execute a saved query 490, which managed query service control plane 320 may look-up and execute. For example, execute saved query request may include a pointer or other identifier to a query stored or saved for a particular user account or client. Managed query service control plane 320 may then access that user query store to retrieve and execute the query (according to techniques discussed below with regard to FIG. 5).

Figure 5:
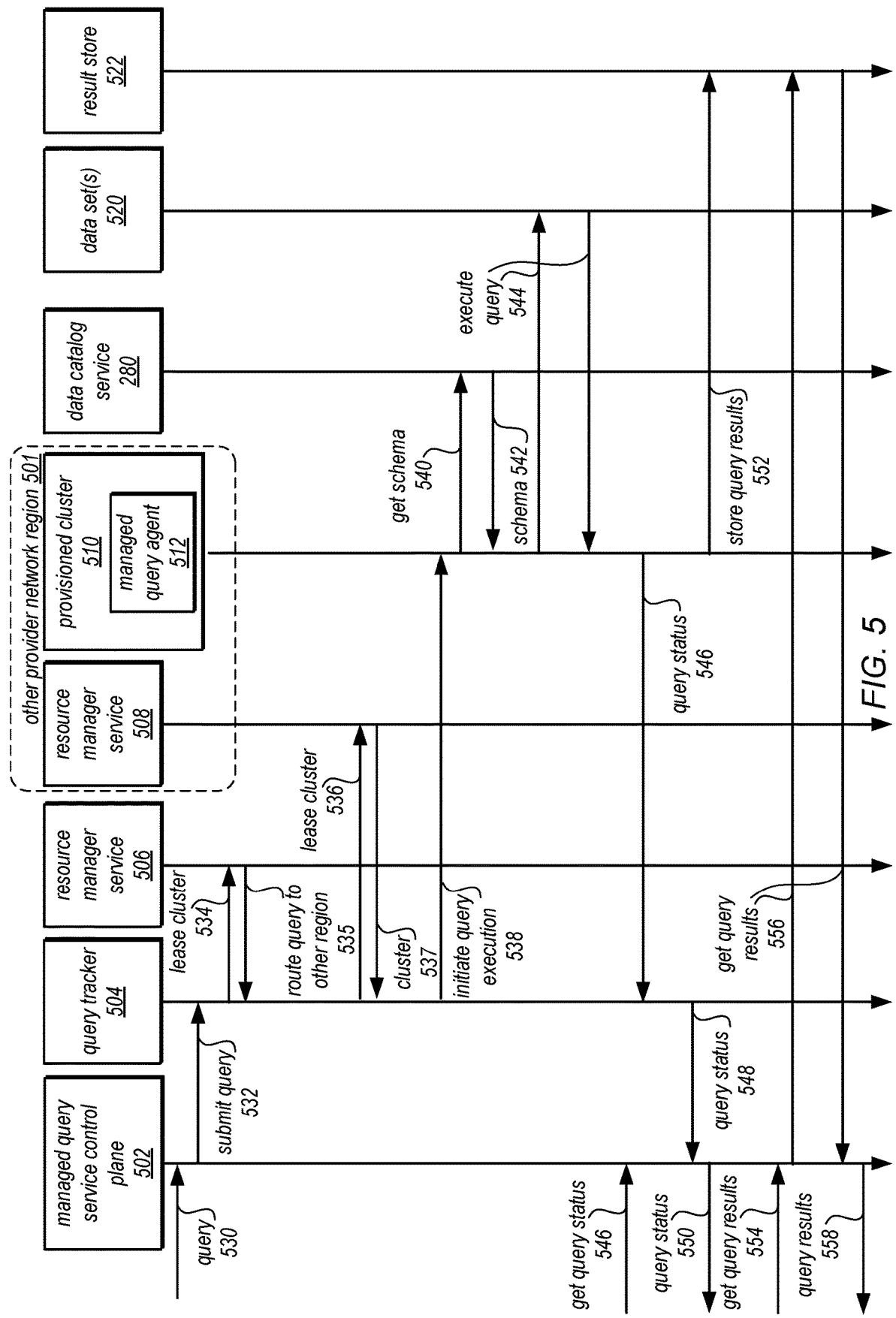
FIG. 5 is a sequence diagram for managed execution of queries routed to computing resources hosted in another network, according to some embodiments.

FIG. 5 is a sequence diagram for managed execution of queries routed to computing resources hosted in another network, according to some embodiments. Query 530 may be received at managed query service control plane 502, via an interface for the managed query service in the provider network region at which it was received, like interface 310 in FIGS. 3 and 4. Managed query service control plane 502 may submit the query 532 to query tracker 503. Query tracker 504, or other component (e.g., resource manager service 506) may determine the type, configuration, or number of nodes within a cluster to process the query, in some embodiments, as discussed below with regard to FIG. 11. Query tracker 504 may request a lease for a cluster 534 to resource management service 506. Resource management service 506 may evaluate available capacity to perform the cluster both in the provider network region at which the query was received and the available capacity of other provider network regions, as discussed below with regard to FIGS. 9 and 10, in some embodiments. In the illustrated example in FIG. 5, resource manager service 506 may send an indication, identity, location or other instruction to route the query to another region 535 (which may identify a particular pool of resources or particular cluster), in some embodiments.

Query tracker 504 may submit another lease request 536 to obtain a cluster to resource manager service 508 in other provider network region 501. In some embodiments, the request 536 (and subsequent communications between provider network regions) may be sent via a public network between the provider network regions. Resource manager service 508 may select a pool and/or cluster for the query (e.g., according to an identified pool or identified type, configuration or number of nodes in a cluster that may be specified in lease request 536). Resource manager service 508 may identify the cluster 537 to query tracker 504. Query tracker 504 may then initiate execution of the query 538 at the provisioned cluster 510, sending a query execution instruction to a managed query agent 512.

Managed query agent 512 may get schema 540 for the data sets(s) 520 from data catalog service 280, which may return the appropriate schema 542. Provisioned cluster 510 can then generate a query execution plan and execute the query 544 with respect to data set(s) 520 according to the query plan. Managed query agent 512 may send query status 546 to query tracker 340, in some embodiments. Managed query agent 512 may modify the rate or amount of status information sent for queries originating from another provider network region (e.g., lowering the reporting rate for other network originating queries than the reporting rage for locally originating queries), in some embodiments, in order to reduce cross-region traffic. Query tracker 504 may report query status 548 in response to get query status 546 request (e.g., based on the received query status 546, sending a response 550 indicating the query status 550.

Provisioned cluster 510 may store the query results 552 in a result store 522 (which may be a data storage service 230). Managed query service control plane 320 may receive a request to get query results 554 and get query results 556 from results store 522 and provide the query results 558 in response, in some embodiments.

Figure 6:
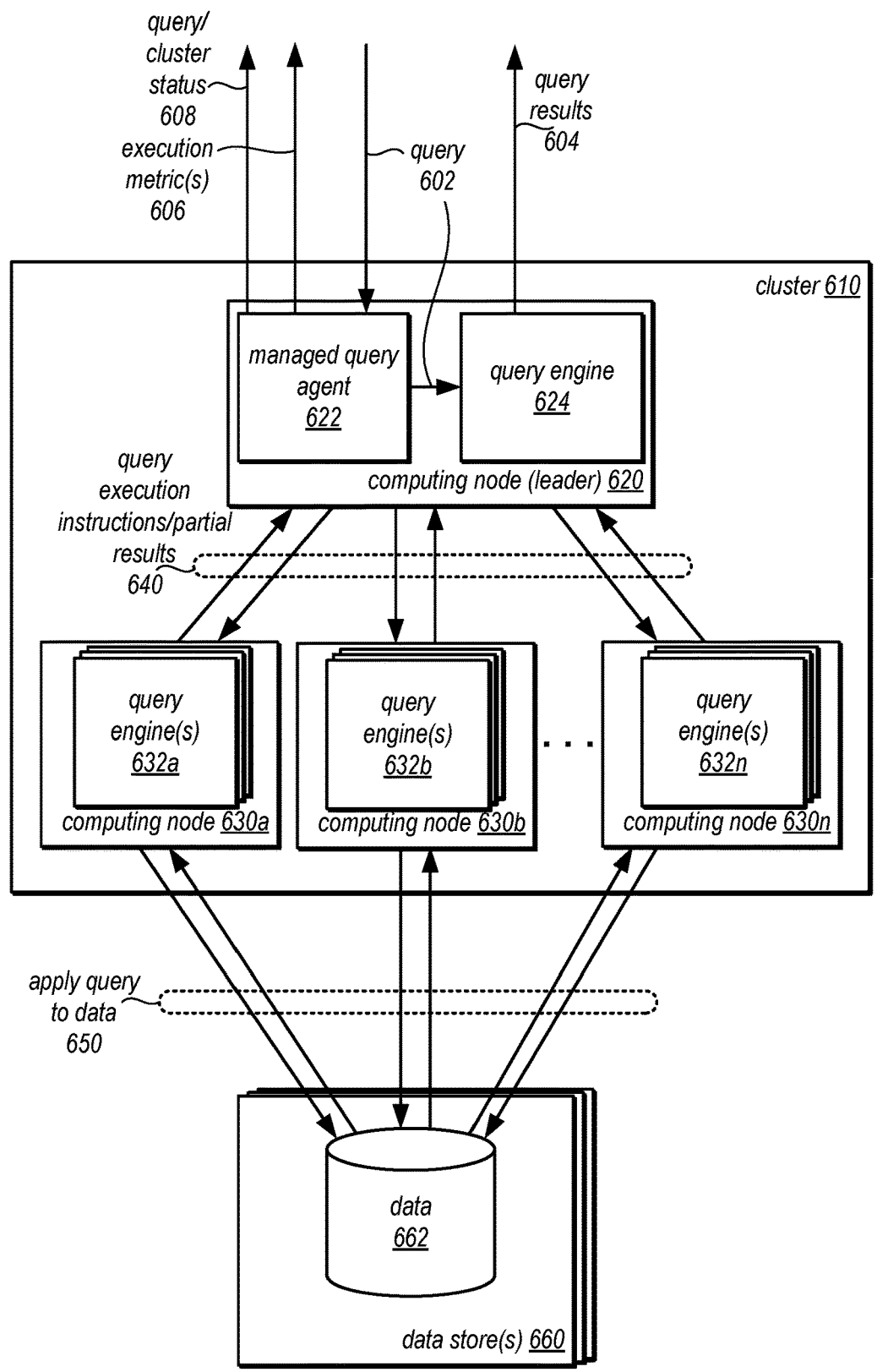
FIG. 6 is a logical block diagram illustrating a cluster processing a query as part of managed query execution, according to some embodiments.

Different types of computing resources may be provisioned and configured in resource pools, in some embodiments. Single-node clusters or multi-node compute clusters may be one example of a type of computing resource provisioned and configured in resource pools by resource management service 290 to service queries for managed query service 270. FIG. 6 is a logical block diagram illustrating a cluster processing a query as part of managed query execution, according to some embodiments. Cluster 610 may implement a computing node 620 that is a leader node (according to the query engine 624 implemented by cluster 610). In some embodiments, no single node may be a leader node, or the leader node may rotate from processing one query to the next. Managed query agent 622 may be implemented as part of leader node 620 in order to provide an interface between the provisioned resource, cluster 610, and other components of managed query service 270 and resource management service 290. For example, managed query agent 622 may provide further data to managed query service 270, such as the status 608 of the query (e.g. executing, performing I/O, performing aggregation, etc.,) and execution metrics 606 (e.g., health metrics, resource utilization metrics, cost metrics, length of time, etc.). In some embodiments, managed query agent 622 may provide cluster/query status 608 and execution metric(s) 606 to resource management service 290 (in order to make pool management decisions, such as modification events, lease requests, etc.). For example, managed query agent 622 may indicate cluster status 608 to resource management service 290 indicating that a query has completed and that the cluster 610 is ready for reassignment (or other resource lifecycle operations).

Leader node 620 may implement query engine 624 to execute queries 602. For instance, managed query agent 622 may implement a programmatic interface for query tracker to submit query 602 and then send the query 602 to query engine 624. Query engine 624 may generate and execute a query plan for query 602, in some embodiments. For example, leader node 622 may send query execution instructions 640 to computing nodes that access and apply the query to data 662 in data store(s) 660 according to the plan. Compute nodes, such as nodes 630*a*, 630*b*, and 630*n*, may respectively implement query engines 632*a*, 632*b*, and 632*n* to execute the query instructions, apply the query to the data 650, and return partial results 640 to leader node 620, which in turn may generate and send query results 604. Query engine 624 and query engines 632 may implement various kinds of distributed query or data processing frameworks, such as the open source Presto distributed query framework or the Apache Spark framework.

Figure 7:
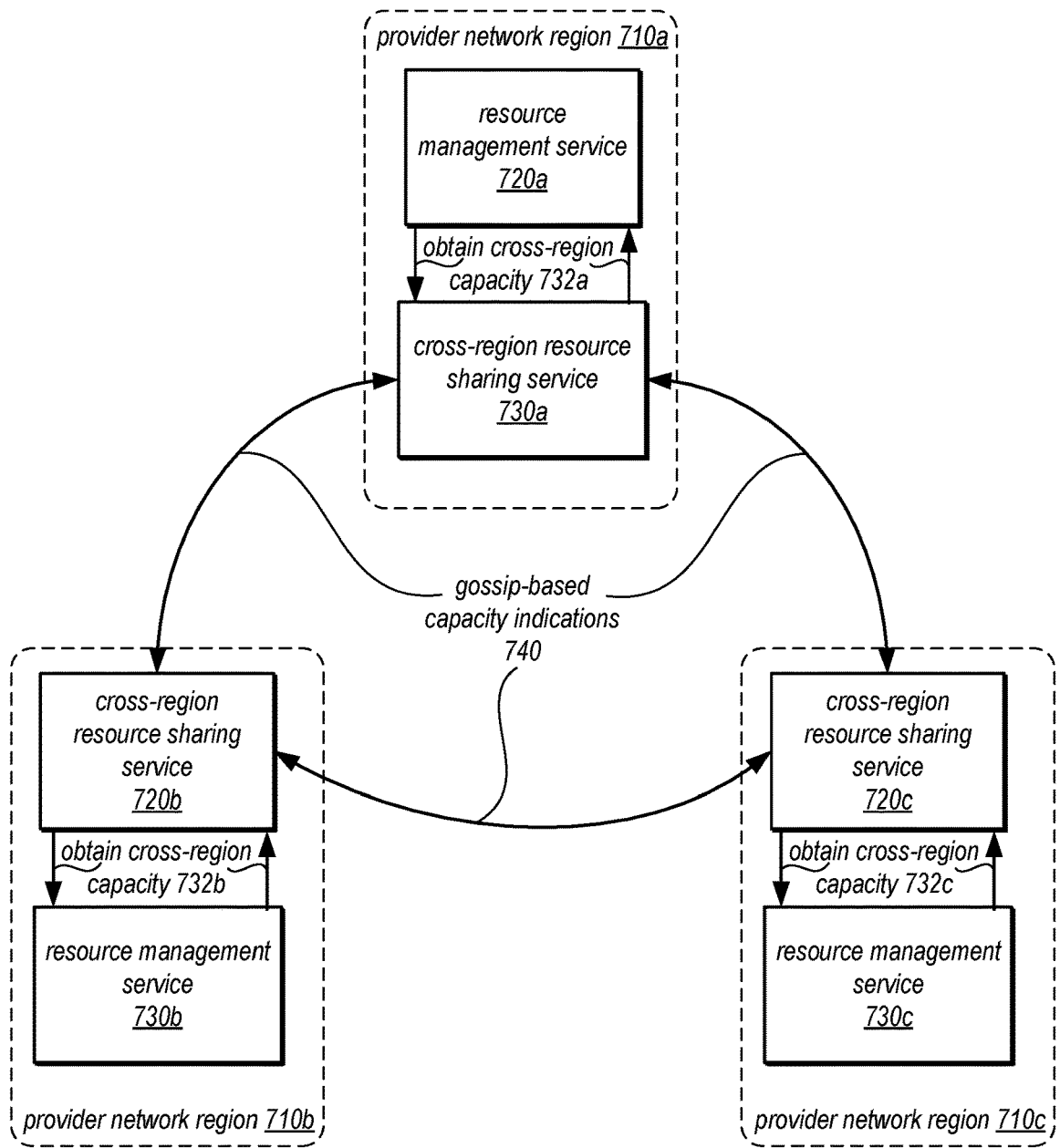
FIG. 7 is a logical block diagram illustrating a cross-region resource sharing service, according to some embodiments.

Resource management services may manage the pools of computing resources for a provider network region, as discussed below with regard to FIG. 8. Additionally resource management services may take advantage of available capacity in other provider network regions. Cross-region resource sharing service may be implemented to provide available capacity information for other regions to the resource management service. FIG. 7 is a logical block diagram illustrating a cross-region resource sharing service, according to some embodiments.

Different provider network regions, such as provider network region 710*a*, 710*b*, and 710*c* may respectively implement a resource management service, such as resource management service 720*a*, 720*b*, and 720*c* for managing pools of computing resources for performing queries. Provider network regions may also implement respective cross-region resource sharing services, such as cross-region resource sharing service 730*a*, 730*b*, and 730*c*. By decoupling the cross-region resource sharing service 730 from the resource management service 720, failures at cross-region resource sharing service 730 may not impact the ability of resource management service 720 to manage, place, and otherwise provide resources for processing queries in the provider network region 710.

Cross-region resource sharing services 730 may communicate or share capacity indications and other resources state information via gossip-based capacity indications 740. For example, gossip protocols that randomly select other regions to share received information with (e.g., resource pool available capacity, resource configurations, types, or numbers, or other information that can be used to select a resource pool, such as failure events) may propagate capacity information to other provider network regions. In other embodiments, polling, scanning, or other communication techniques may be implemented to share capacity indications amongst regions.

Resource management services 730 may respectively query or otherwise obtain the state or view of available resource capacity across regions, 732*a*, 732*b*, and 732*c*, in order to determine whether an in-region resource should be selected or resource in another region, in some embodiments. Queries 732 may be performed when a lease request is received or periodically to update an internal cross-region view of capacity at resource management service 730. Views of cross-region resource capacity maintained may not have strict consistency requirements, in some embodiments, so that part of the cross-region state maintained at any one cross-region resource sharing service may be partially stale or different with respect to the current state of the other region described.

Figure 8:
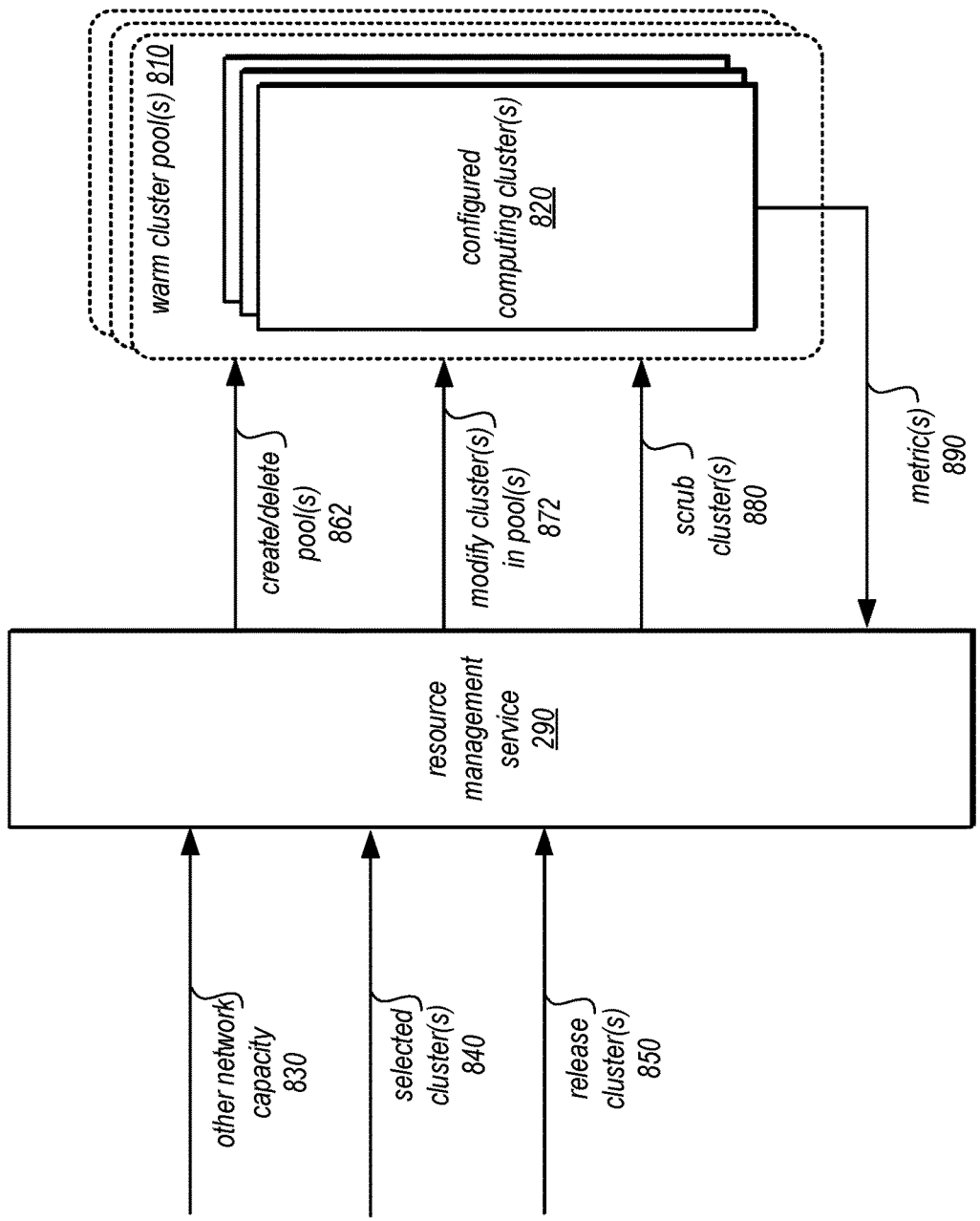
FIG. 8 is logical block diagram illustrating interactions with a resource management service and pools of resources, according to some embodiments.

FIG. 8 is logical block diagram illustrating interactions between a resource management service and pools of resources, according to some embodiments. Resource management service 290 may implement a programmatic interface (e.g., API) or other interface that allows other network-based services (or a client or a provider network) to submit requests for preconfigured resources from a resource pool managed by resource management service 290. For example, a response to a request for cross-region or other network resource capacity may be received 830 (e.g., from cross-region resource sharing service) in order to provide a snapshot or other state of configured computing clusters in warm cluster pools at other provider network regions, in some embodiments. Query tracker may send an indication that identifies the selected cluster 840 (e.g., by specifying a location, identifier, or other information for the identified computing resource) for performing a query so that resource manager service 290 may remove the resource from the pool of available resource. For example, resource management service 290 may update state information for the cluster to indicate that the cluster is leased or otherwise unavailable. Resource management service 290 may also receive requests to release a cluster 850 from a current assignment (e.g., as the query execution at the cluster is complete). Resource management service 290 may then update state information (e.g., the lease) for the cluster and pool to return the cluster to the pool, in some embodiments.

As indicated at 862, resource management service 290 may automatically (or in response to requests (not illustrated)), commission or decommission pool(s) of clusters 810. For example in some embodiments, resource management service 290 may perform techniques that select the number and size of computing clusters 820 for the warm cluster pool 810. The number and size of the computing clusters 820 in the warm cluster pool 810 can be determined based upon a variety of factors including, but not limited to, historical and/or expected volumes of query requests, the price of the computing resources utilized to implement the computing clusters 820, and/or other factors or considerations, in some embodiments.

Once the number and size of computing clusters 820 has been determined, the computing clusters 820 may be instantiated, such as through the use of an on-demand computing service, or virtual compute service or data processing service as discussed above in FIG. 2. The instantiated computing clusters 820 can then be configured to process queries prior to receiving the queries at the managed query service. For example, and without limitation, one or more distributed query frameworks or other query processing engines can be installed on the computing nodes in each of the computing clusters 820. As discussed above, in one particular implementation, the distributed query framework may be the open source PRESTO distributed query framework. Other distributed query frameworks can be utilized in other configurations. Additionally, distributed processing frameworks or other query engines can also be installed on the host computers in each computing cluster 820. As discussed above, the distributed processing frameworks can be utilized in a similar fashion to the distributed query frameworks. For instance, in one particular configuration, the APACHE SPARK distributed processing framework can also, or alternately, be installed on the host computers in the computing clusters 820.

Instantiated and configured computing clusters 820 that are available for use by the managed query service 270 are added to the warm cluster pool 810, in some embodiments. A determination can be made as to whether the number or size of the computing clusters 820 in the warm cluster pool needs is to be adjusted, in various embodiments. The performance of the computing clusters 820 in the warm cluster pool 810 can be monitored based on metric(s) 890 received from the cluster pool. The number of computing clusters 820 assigned to the warm cluster pool 810 and the size of each computing cluster 820 (i.e. the number of host computers in each computing cluster 820) in the warm cluster pool 810 can then be adjusted. Such techniques can be repeatedly performed in order to continually optimize the number and size of the computing clusters 820 in the warm cluster pool 810. Configurations of clusters for a resource pool or a new pool may be provided as provisioning recommendations, which may indicate the configuration of a cluster (e.g. query engine type, query engine configuration settings) in some embodiments. As indicated at 872, in some embodiments resource management service may modify the cluster(s) in pool(s) 872, to change the number of clusters, reconfigure clusters, or make other changes to clusters. In some embodiments, resource management service 290 may increase or decrease pool membership (or commission or decommission pool(s)) based, at least in part, on the available capacity 830 of other regions. For example, resource management pool(s) 810 may decommission a pool of large clusters based on the high available capacity of large clusters in a pool hosted in another provider network region.

As indicated at 880, in some embodiments, resource management service 270 may scrub clusters(s) 880, (e.g., as a result of the lease state transitioning to expired or terminated) by causing the cluster to perform operations (e.g., a reboot, disk wipe, memory purge/dump, etc.) so that the cluster no longer retains client data and is ready to process another query. For example, resource management service 290 may determine whether a computing cluster 820 is inactive (e.g. the computing cluster 820 has not received a query in a predetermined amount of time). If resource management service 290 determines that the computing cluster 820 is inactive, then the computing cluster 820 may be disassociated from the submitter of the query. The computing cluster 820 may then be "scrubbed," such as by removing data associated with the submitter of the queries from memory (e.g. main memory or a cache) or mass storage device (e.g. disk or solid state storage device) utilized by the host computers in the computing cluster 820. The computing cluster 820 may then be returned to the warm cluster pool 810 for use in processing other queries. In some embodiments, some clusters that are inactive might not be disassociated from certain users in certain scenarios. In these scenarios, the user may have a dedicated warm pool of clusters 810 available for their use.

Figure 9:
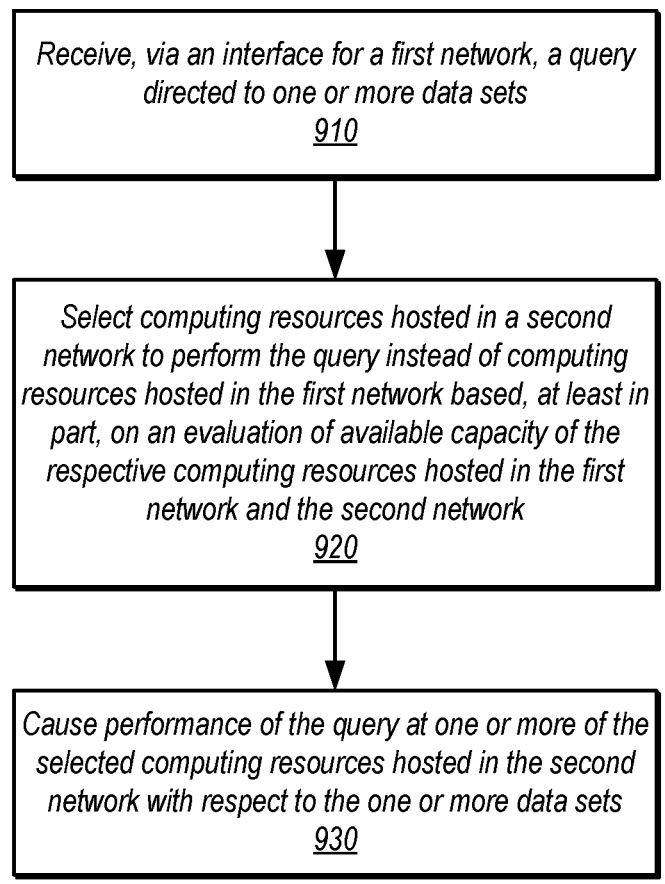
FIG. 9 is a high-level flowchart illustrating various methods and techniques to implement selecting resources to perform queries hosted in different networks according to available capacity, according to some embodiments.

Although FIGS. 2-8 have been described and illustrated in the context of a provider network including different regions of resources hosted in different networks that can be selected to perform queries according to the available capacity resources hosted in the different regions, the various components illustrated and described in FIGS. 2-8 may be easily applied to other systems, or devices that host resources in different networks which may be selected for processing a query received at a different network. As such, FIGS. 2-8 are not intended to be limiting as to other embodiments of a system that may implement a global resource from the query engines or other processing platforms performing queries. FIG. 9 is a high-level flowchart illustrating various methods and techniques to implement selecting resources to perform queries hosted in different networks according to available capacity, according to some embodiments. Various different systems and devices may implement the various methods and techniques described below, either singly or working together. For example, a query optimization service as described above with regard to FIGS. 2-8 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 910, a query may be received via an interface for a first network that is directed to one or more data sets. The query may be directed to data set(s) separately stored in remote data stores, in various embodiments (e.g., data stored at storage resources hosted in different regions or other networks than the first network, such as the second network or another network). In some embodiments, data from the data set may be stored at storage resources hosted in the same network that received the query, the first network. For example, a query may be received via the various types of interfaces described above with regard to FIG. 4 (programmatic, user console, driver, etc.), in one embodiment. A query may be formatted according to different query languages, or specifications of query languages including Structured Query Language (SQL) and/Hive Query Language (HQL). The query may include execution hints, specifying the type of query execution engine to utilize, query execution limits, or other parameters or properties for configuring the execution of the query, in some embodiments. The interface for the first network may be implemented at a separate interface component, layer, or service, as discussed above with regard to FIG. 4, or may be implemented as part of computing resources in the network that perform queries, in some embodiments.

As indicated at 920, computing resources hosted in a second network may be selected to perform the query instead of computing resources hosted in the first network, in various embodiments. The selection may be based, at least in part, on an evaluation of available capacity of the respective computing resources hosted in the first network and the second network. Available capacity for the resources in the first network and the second network may be determined in different ways. For instance, the gossip-based communication implemented amongst different capacity collection systems or components as discussed above in FIG. 7, may be implemented to collect, track, update, or otherwise maintain a view of available capacity of resources hosted in different networks (e.g., either in aggregate or the individual capacity of individual resources). Polling techniques to request and exchange capacity information may be exchanged amongst different networks, indicating the capacity of individual resources or the resources of a network in aggregate, in some embodiments. As discussed above and below with regard to FIG. 10, the availability of collections or pools of resources may be obtained. The configuration, size, type, or other attributes of resources in a pool of a network may be obtained so that the available capacity of different types, sizes, configurations, or other attributes of resources that can perform a query may be evaluated, in some embodiments, such as discussed below with regard to FIG. 10.

In some embodiments, available capacity may be evaluated to select resources based on a time value that the resources become available (e.g., a lease expiration time). A selection may be made to select a computing resources that are not yet, but will become available to perform the query based on a comparison between the available time value and a threshold value (e.g., available time value is 3 minutes from current time, which may be less than the 10 min threshold value).

Selection of resources in a different network, such as the second network, than the network that received the query, the first network, may be made according to a variety of factors. For example, available capacity of a network may be determined based on whether the computing resources used to perform queries in the network are up, healthy, online, or not suffering from failure conditions. A failure event detected for computing resources (e.g., because of a service that implements the computing resources like virtual compute service 210 or data processing services 220), may be indicate that little or no capacity is available for performing the query in the network. Thus, in such a scenario, another network may be selected (e.g., that is not indicated as suffering from a failure event). Other factors or selection criteria may include the location of other network resources with respect to data sets that are being targeted by criteria. If, for instance, two networks have available capacity to perform a query, then the network that includes or hosts the targeted data sets (or includes or hosts more of the data sets than other networks) may be selected. Other analyses, such as those discussed below with regard to FIG. 10 may also be performed, in some embodiments, to select resources for performance of a query.

As indicated at 930, performance of the query at one or more of the selected computing resources hosted in the second network may be caused with respect to the one or more data sets, in some embodiments. For example, a request may be formatted according to an interface for the second network identifying the query, the originating service, system, or component within the first network managing performance of the query (e.g., query tracker 340), resource configuration, number of resources, type of resources, or other performance instructions (e.g., a query plan or query hints). The generated request may then be sent to the second network via a network interface for the second network. In some embodiments, components of the first network may communicate directly with components of the second network (e.g., a resource manager service in the second network or processing clusters in the second network). In some embodiments, the query may be forwarded, routed, or otherwise redirected to the second network and may include an indication that an evaluation of available capacity for performing the query has already identified the second network for performing the query so that the query is not shuffled from network to network without being performed, in some embodiments.

In some embodiments, query failures may be detected. For example, computing resources may run out of memory, suffer hardware failure (e.g., overheating, power supply or other component failure), or abort processing because of software-related glitches or bugs. In response to the detection of a query failure, a component or system managing the execution of a query (e.g., a query tracker 340 in FIG. 3) may perform another evaluation of available capacity and select other resources to retry the query, in some embodiments. The selection of resources that are to perform retried query may be hosted in a different network (e.g., the first network instead of the second network). In this way, selecting resources to perform queries hosted in different networks according to available capacity may dynamically respond to changing conditions after the initial selection and start of a query, in addition to responding to changing conditions before the performance of a query.

In at least some embodiments, selected computing resources may be reserved (if not yet available). For example, a reservation request may be sent to the second network (e.g., to a resource management component, such as the local resource management service 290) to identify particular resources (or a pool of resources) to reserve. A queue or other reservation data structure may store reservations for resources so that the resources may be provided to perform queries on behalf of other networks that reserved the queries. A reservation notification or indication may be sent to the first network when the resource(s) become available, so that the first network may cause (e.g., direct, route, or otherwise initiate) performance of the query at the selected resources in response to the reservation notification, in some embodiments.

Figure 10:
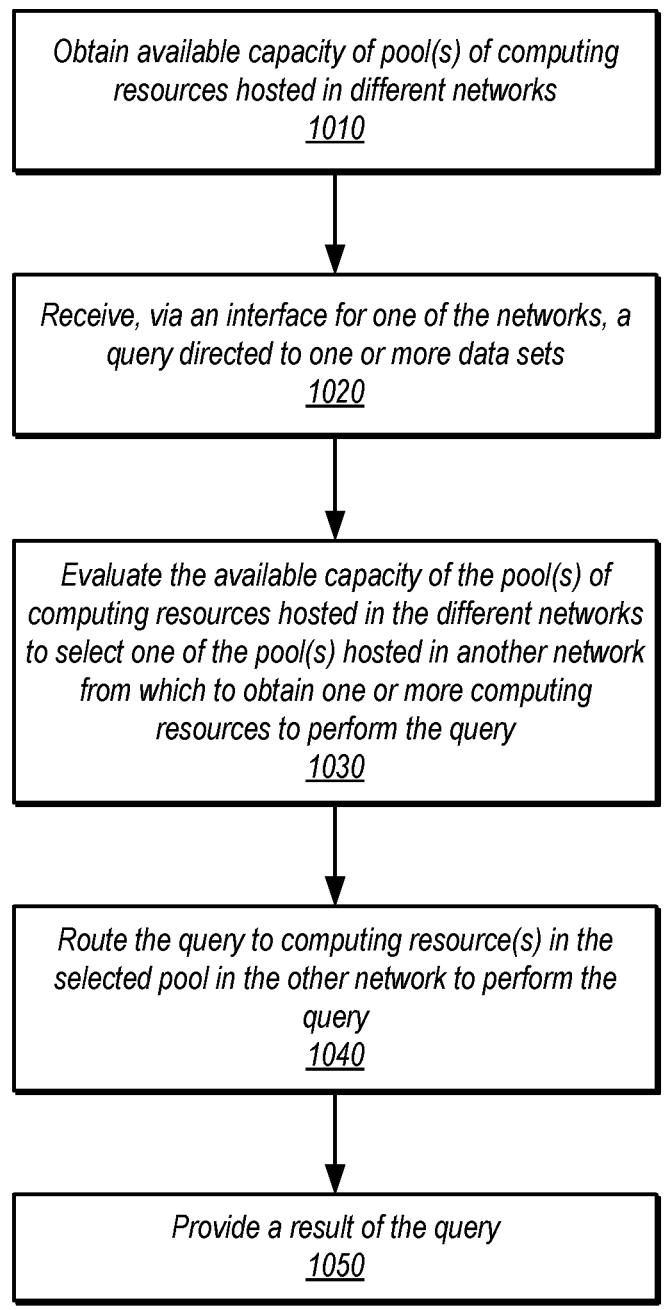
FIG. 10 is a high-level flowchart illustrating various methods and techniques to implement routing queries to resources in pools of resources hosted in different networks according to available capacity, according to some embodiments.

As discussed above with regard to FIGS. 2-8, resources may be managed as collection or pools of resources, in some embodiments. FIG. 10 is a high-level flowchart illustrating various methods and techniques to implement routing queries to resources in pools of resources hosted in different networks according to available capacity, according to some embodiments. As indicated at 1010, available capacity of pool(s) of computing resources hosted in different networks may be obtained, in some embodiments. For example, techniques for sweeping the available of pools as performed by resource manager services and/or query trackers, as discussed above with regard to FIGS. 2-8. may be implemented to collect the available capacity of the pool(s) in a network. The available capacity of the pool(s) may be aggregated and shared with different networks (e.g., according to the gossip based technique discussed above or utilizing a polling, scanning, or sweeping method to ask for available capacity at other networks and response to such requests with the aggregated capacity of the other networks in kind, in some embodiments. Failure events, or other notifications that may indicate or affect the capacity of networks, or pools therein, may be shared (e.g., service failure events, data center failures events, power failures, or network failures within a network) to indicated available capacity of pool(s).

As indicated at 1020, a query may be received for an interface for one of the networks that is directed to one or more data sets. Similar to the discussion above with regard to FIG. 9, the query may be directed to data set(s) separately stored in remote data stores, in various embodiments (e.g., data stored at storage resources hosted in different regions or other networks than the first network, such as the second network or another network). In some embodiments, data from the data set may be stored at storage resources hosted in the same network that received the query, the first network. For example, a query may be received via the various types of interfaces described above with regard to FIG. 4 (programmatic, user console, driver, etc.), in one embodiment. A query may be formatted according to different query languages, or specifications of query languages including Structured Query Language (SQL) and/Hive Query Language (HQL). The query may include execution hints, specifying the type of query execution engine to utilize, query execution limits, or other parameters or properties for configuring the execution of the query, in some embodiments. The interface for the first network may be implemented at a separate interface component, layer, or service, as discussed above with regard to FIG. 4, or may be implemented as part of computing resources in the network that perform queries, in some embodiments.

As indicated at 1030, the available capacity of the pool(s) of computing resources hosted in the different networks may be evaluated to select one of the pool(s) hosted in another network from which to obtain one or more computing resources to perform the query, in some embodiments. For example, as discussed below with regard to FIG. 11, the type, number, or configuration or resources to perform the query may be determined so that the pool that includes resources of the desired type, number, or configuration may be selected, in some embodiments. In some embodiments, available capacity may be one of multiple factors or criteria considered to select a pool in other networks. For example, load balancing or other schemes that distribute work evenly may be implemented in addition to available capacity to break ties between pools with similar available capacity. Another example criteria may be the likelihood that another query submitted from the same user or data sets may be performed, so that available capacity evaluations may consider a prediction or forecast of resource consumption when evaluating available capacity (e.g., which resources could handle performing two requests from the same user so that work could progress on both queries without violating data security—as the same user would be allowed access to the same data and thus could operate on the same computing resource).

As indicated at 1040, the query may be routed to computing resource(s) in the selected pool in the other network to perform the query, in some embodiments. For example, as discussed above with regard to FIG. 5, a lease or other mechanism for obtaining or acquiring permission to utilize a cluster or other computing resources in a pool may be obtained by sending a request for the resources to the resource management service in the network that hosts the computing resources. In some embodiments, the request may be merely a request for resources from the pool with the resource management service (or other pool management component) selecting and identifying resources for performing the query and identifying the selected resources in response. The query may then be routed to the selected resource received from the pool, in some embodiments. In some embodiments, a request to initiate or begin processing at the selected computing resource(s) may be performed, according to an API request or the query may be initiated by transmitting the query in its original format to the selected computing resources for execution.

As indicated at 1050, a result of the query may be provided, in some embodiments. For example, the results can be sent to a destination or location specified for the query results (e.g., in a client request), in one embodiment. The results may be streamed back or aggregated (e.g., in a data store, like data storage service 230) and provided as a batch (or batches, such as paginated results) via a same interface (e.g., programmatic, graphical, driver, console, etc.) that received the query. In some embodiments, the results may be provided to a location or via the interface of the network that first received the query, or in a location/interface of the other network that hosts the selected pool of resources.

Figure 11:
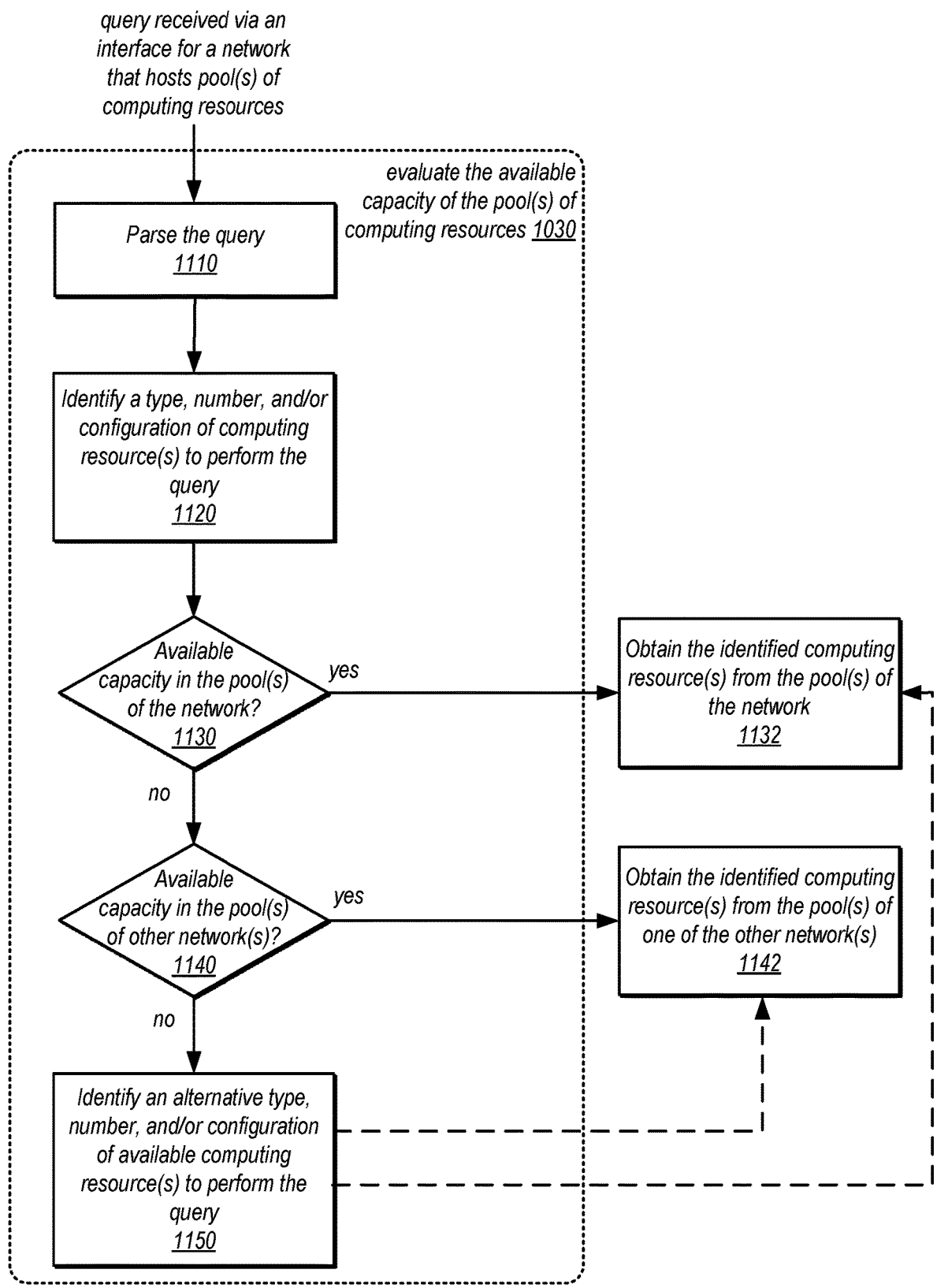
FIG. 11 is a high-level flowchart illustrating various methods and techniques to evaluate available capacity of resources hosted in different networks to perform queries, according to some embodiments.

Available capacity of pools of computing resources may be evaluated in order to identify a pool from which to obtain resources for performing a query. Similar evaluating techniques may also be performed for individual or other collections of resources in different networks. FIG. 11 is a high-level flowchart illustrating various methods and techniques to evaluate available capacity of resources hosted in different networks to perform queries, according to some embodiments.

A query for performance may be received via an interface for a network that hosts pool(s) of computing resources, in some embodiments, as discussed above with regard to FIGS. 9 and 10. As part of the evaluation of the query, the query may be parsed in some embodiments, as indicated at 1110. For example, parse trees or other parsed formats of the query may be generated according to different types of query engines and other query performance platforms. In some embodiments, the query may be parsed into multiple query tress or other parsed formats according to the different possible types of query engines and other query performance platforms that may be selected from for perform the query.

As indicated at 920, a type, number, and/or configuration of computing resource(s) to perform the query may be determined, in some embodiments. An engine type may include different data or query processing platforms, including but not limited to Presto or Apache Spark. The configuration of computing resources may include various hardware and/or software configurations (e.g., number and speed of processors, number, speed, and size of storage devices, number and speed of networking devices, operating system, etc.) and/or the configuration of the engine (e.g., which properties are enabled or disabled on the engine). In some embodiments, the number of computing resources (e.g., the size of a cluster) may be the number of computing resources participating in the performance of the query.

Identification of the type, number, and/or configuration of computing resource(s) to perform the query may be performed in different ways. For example, machine learning and/or other modeling techniques may be implemented to evaluated the parsed query and determine the cost to perform the query with respect to different types, numbers, and/or configurations of computing resources and select the lowest cost (e.g., in terms of performance cost, such as least amount of time, least number of resources used, etc.), in some embodiments. In some embodiments, the data sets target by the query may indicate the type, number and/or configuration of computing resources. For example, data set(s) may be stored according to a certain format that can only be processed by a predefined set of query engines. Default type, number, and/or configuration of computing resources may be specified for queries in some embodiments, unless otherwise indicated in the query or as part of a user request to perform the query (which may include the type, number and/or configuration of the computing resource(s)), in some embodiments.

Once the type, number, and/or configuration of computing resource(s) is identified, the available capacity of pool(s) in the network which received the query may be first evaluated for computing resources that satisfy or match the identified type, number, and/or configuration of computing resource(s), in some embodiments, as indicated at 1130. In this way a prioritization of in-network resources may be applied. If available capacity exists in the pool(s) of the network, then the identified computing resource(s) may be obtained from the pool(s) of the network, as indicated at 1132, in some embodiments. If not, then as indicated at 1140, available capacity in the pool(s) of other network(s) may be evaluated for computing resources that satisfy or match the identified type, number, and/or configuration of computing resource(s). If available capacity exists in the pool(s) of one of the other networks, then the identified computing resource(s) may be obtained from of one of the pool(s) of the other networks, as indicated at 1142, in some embodiments. If multiple pools from different networks have similar capacity, then other techniques the evenly distribute or load balance outside network query performance may be implemented, as discussed above.

In some scenarios, no capacity for computing resource(s) that satisfy or match the identified type, number, and/or configuration of computing resource(s) may be available. As indicated at 1150, in some embodiments, an alternative type, number, and/or configuration of computing resource(s) may be determined that matches the available capacity in either the network or the other network(s) to obtain resources to perform the query, as indicated by the dotted lines to 1132 and 1142. For example, a best match or closest match technique that compares which resource pool(s) has available capacity that is most similar to the identified type, number, and/or configuration of computing resource(s) may be performed to determine the alternative type, number, and/or configuration of the computing resource(s) to perform the query, in some embodiments.

The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 12:
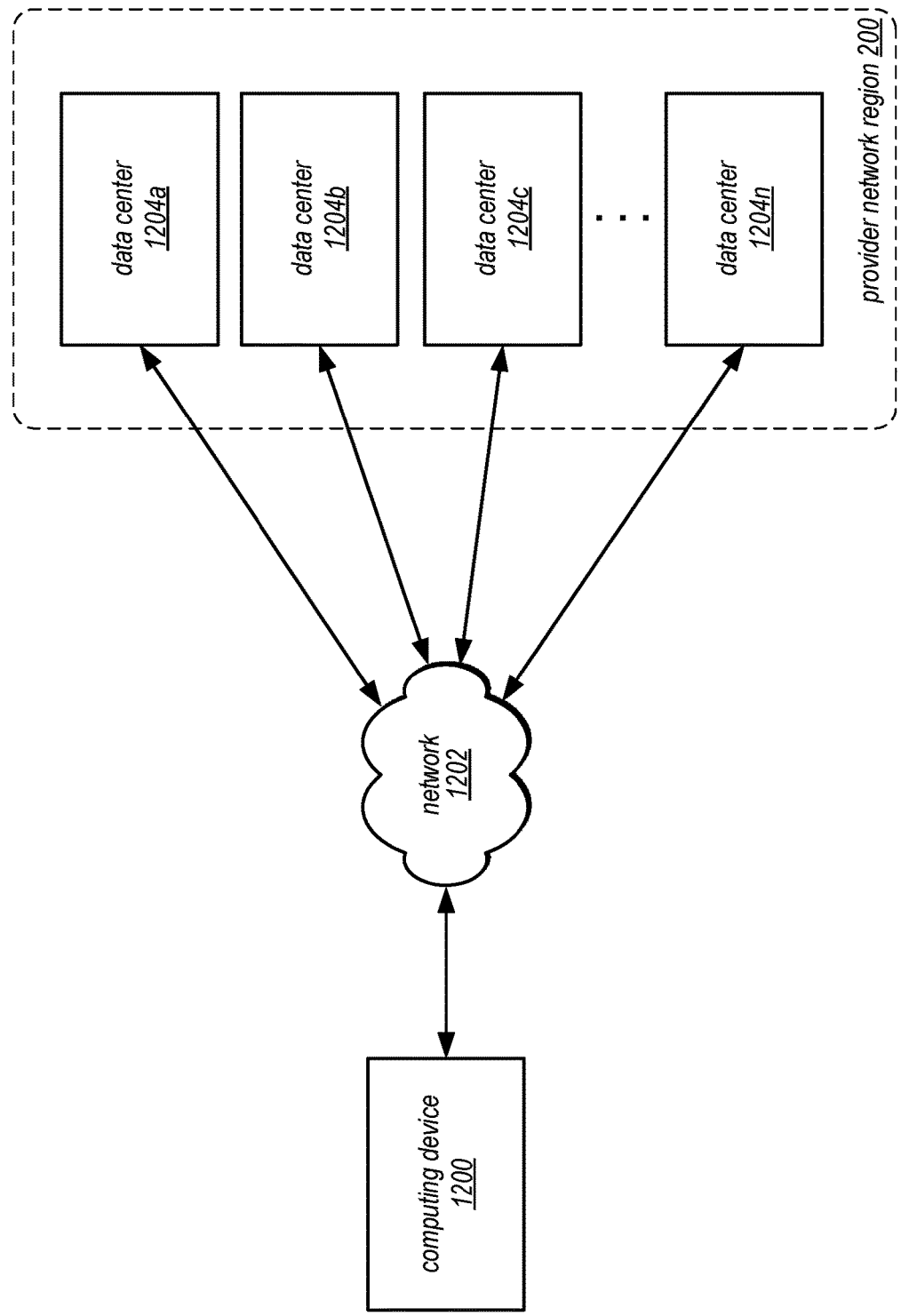
FIG. 12 is a logical block diagram that shows an illustrative operating environment that includes a service provider network that can be configured to implement aspects of the functionality described herein, according to some embodiments.

FIG. 12 is a logical block diagram that shows an illustrative operating environment that includes a service provider network that can implement any of the functionality described herein, according to some embodiments. As discussed above, the provider network region 200 can provide computing resources, like VM instances and storage, on a permanent or an as-needed basis. Among other types of functionality, the computing resources provided by the provider network region 200 can be utilized to implement the various services described above. As also discussed above, the computing resources provided by the provider network region 200 can include various types of computing resources, such as data processing resources like VM instances, data storage resources, networking resources, data communication resources, network services, and the like.

Each type of computing resource provided by the provider network region 200 can be general-purpose or can be available in a number of specific configurations. For example, data processing resources can be available as physical computers or VM instances in a number of different configurations. The VM instances can execute applications, including web servers, application servers, media servers, database servers, some or all of the services described above, and/or other types of programs. The VM instances can also be configured into computing clusters in the manner described above. Data storage resources can include file storage devices, block storage devices, and the like. The provider network region 200 can also provide other types of computing resources not mentioned specifically herein.

The computing resources provided by the service provider network may be implemented, in some embodiments, by one or more data centers 1204A-1204N (which might be referred to herein singularly as "a data center 1204" or in the plural as "the data centers 1204"). The data centers 1204 are facilities utilized to house and operate computer systems and associated components. The data centers 1204 typically include redundant and backup power, communications, cooling, and security systems. The data centers 1204 can also be located in geographically disparate locations. One illustrative configuration for a data center 1204 that can be utilized to implement the technologies disclosed herein will be described below with regard to FIG. 13.

The customers and other users of the provider network region 200 can access the computing resources provided by the provider network region 200 over a network 1202, which can be a wide area communication network ("WAN"), such as the Internet, an intranet or an Internet service provider ("ISP") network or a combination of such networks. For example, and without limitation, a computing device 1200 operated by a customer or other user of the provider network region 200 can be utilized to access the provider network region 200 by way of the network 1202. It should be appreciated that a local-area network ("LAN"), the Internet, or any other networking topology known in the art that connects the data centers 1204 to remote customers and other users can be utilized. It should also be appreciated that combinations of such networks can also be utilized.

Figure 13:
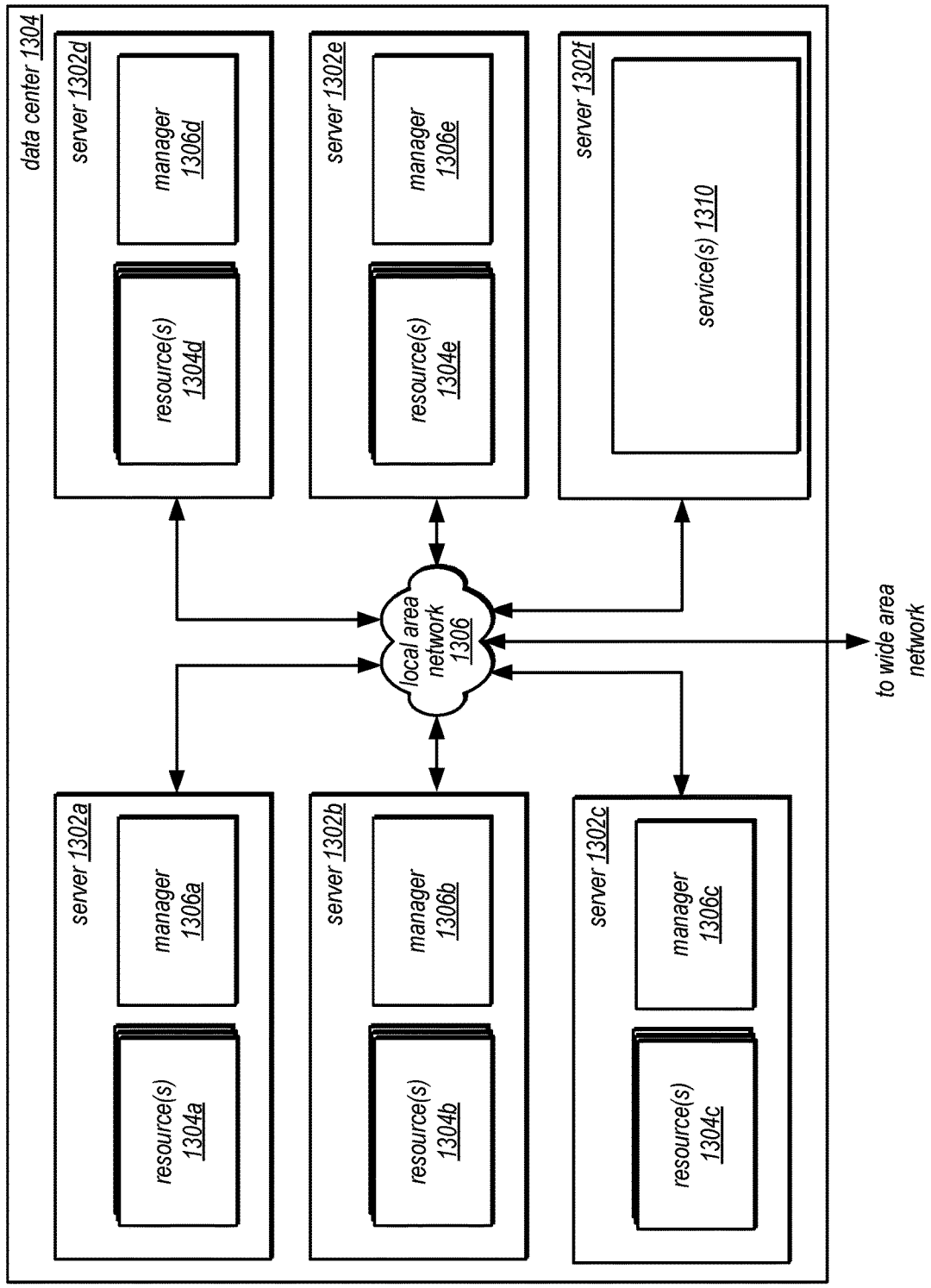
FIG. 13 is a logical block diagram illustrating a configuration for a data center that can be utilized to implement aspects of the technologies disclosed herein, according to some embodiments.

FIG. 13 is a logical block diagram illustrating a configuration for a data center that can be utilized to implement aspects of the technologies disclosed herein, according to various embodiments. FIG. 13 is a computing system diagram that illustrates one configuration for a data center 1204 that implements aspects of the technologies disclosed herein for providing managed query execution, such as managed query execution service 270, in some embodiments. The example data center 1204 shown in FIG. 13 includes several server computers 1302A-1302F (which might be referred to herein singularly as "a server computer 1302" or in the plural as "the server computers 1302") for providing computing resources 1304A-1304E.

The server computers 1302 can be standard tower, rackmount, or blade server computers configured appropriately for providing the computing resources described herein (illustrated in FIG. 13 as the computing resources 1304A-1304E). As mentioned above, the computing resources provided by the provider network region 200 can be data processing resources such as VM instances or hardware computing systems, computing clusters, data storage resources, database resources, networking resources, and others. Some of the servers 1302 can also execute a manager 1306 capable of instantiating and/or managing the computing resources. In the case of VM instances, for example, the manager 1306 can be a hypervisor or another type of program may enable the execution of multiple VM instances on a single server computer 1302. Server computers 1302 in the data center 1204 can also provide network services and other types of services, some of which are described in detail above with regard to FIG. 2.

The data center 1204 shown in FIG. 13 also includes a server computer 1302F that can execute some or all of the software components described above. For example, and without limitation, the server computer 1302F can execute various components for providing different services 1310 of a provider network region 200, such as the a virtual compute services 210*a* and 210*b*, data processing service(s) 220*a* and 220*b*, data storage service(s) 230*a* and 230*b*, other services 240*a* and 240*b*, managed query service 270*a* and 270*b*, data catalog service 280*a* and 280*b*, resource management service 290*a* and 290*b*, and cross-region resource sharing service 292*a* and 292*b* and/or the other software components described above. The server computer 1302F can also execute other components and/or to store data for providing some or all of the functionality described herein. In this regard, it should be appreciated that the services illustrated in FIG. 13 as executing on the server computer 1302F can execute on many other physical or virtual servers in the data centers 1204 in various configurations.

In the example data center 1204 shown in FIG. 13, an appropriate LAN 1306 is also utilized to interconnect the server computers 1302A-1302F. The LAN 1306 is also connected to the network 1202 illustrated in FIG. 12. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1204A-1204N, between each of the server computers 1302A-1302F in each data center 1204, and, potentially, between computing resources in each of the data centers 1204. It should be appreciated that the configuration of the data center 1204 described with reference to FIG. 13 is merely illustrative and that other implementations can be utilized.

Embodiments of engine independent query plan optimization as described herein may be executed on one or more computer systems, which may interact with various other devices. One such computer system is illustrated by FIG. 13. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

Figure 14:
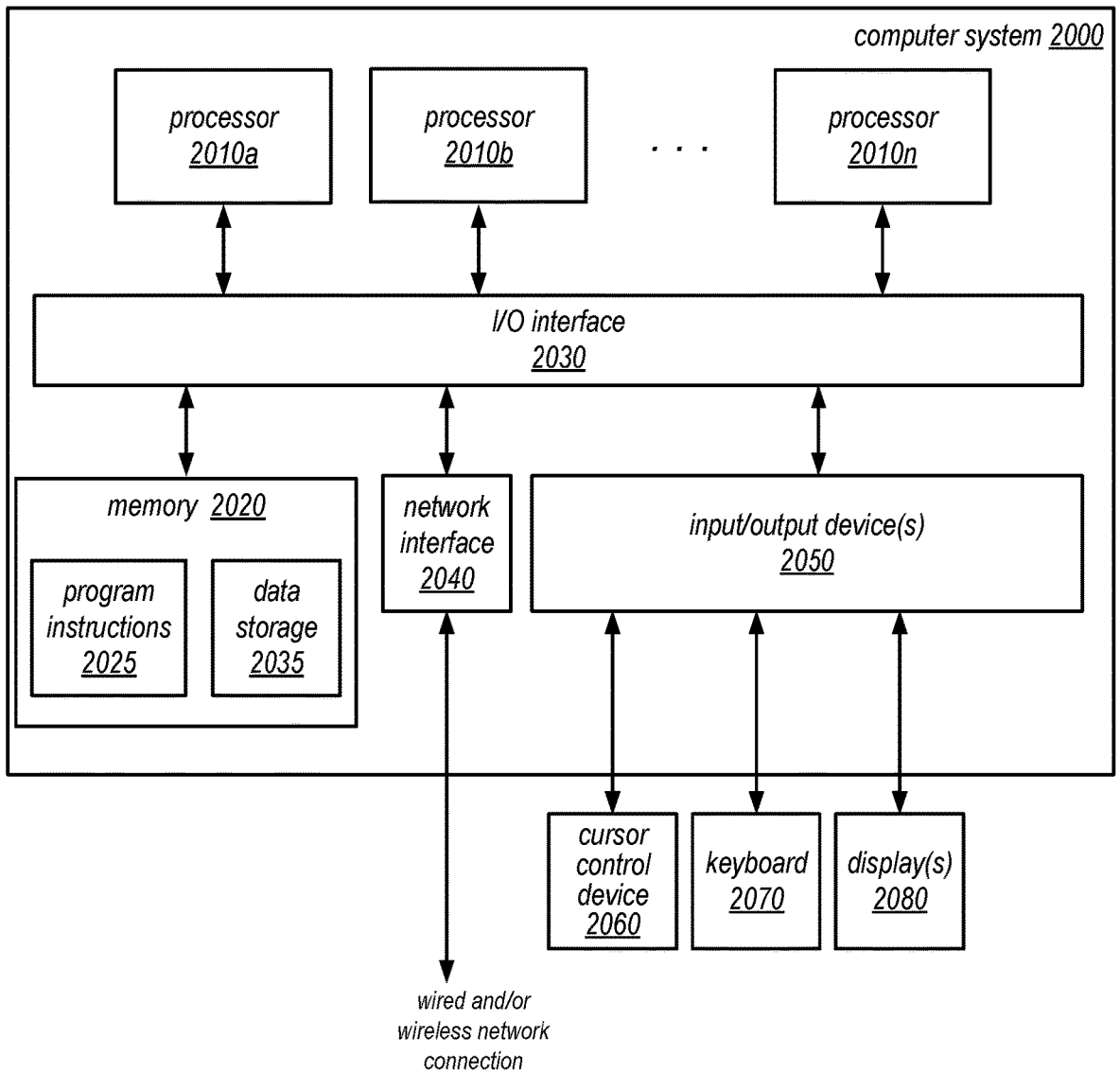
FIG. 14 illustrates an example system configured to implement the various methods, techniques, and systems described herein, according to some embodiments.

As shown in FIG. 14, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
 a memory to store program instructions which, if performed by at least one processor, cause the at least one processor to:
  receive, via an interface for a first network, a query directed to one or more data sets;
  in response to receipt of the query:
   evaluate available capacity to perform the query at one or more pools of computing resources hosted in the first network and one or more pools of computing resources hosted in a second network;
   select, based at least in part on said evaluate available capacity to perform the query at one or more pools of computing resources hosted in the first network and one or more pools of computing resources hosted in a second network, one of the pools of computing resources hosted in the second network from which to obtain one or more computing resources to perform the query; and
   route the query to the one or more computing resources of the selected pool hosted in the second network with respect to the one or more data sets.

2. The system of claim 1, wherein the program instructions further cause the at least one processor to obtain the available capacity of the pools of computing resources hosted in the first network and the available capacity of the pools of computing resources hosted in the second network.

3. The system of claim 1, wherein the program instructions further cause the at least one processor to:
 identify for the performance of the query at least one of:
  a type of computing resource to perform the query;
  a number of computing resources to perform the query; or
  a configuration of computing resource to perform the query; and
 wherein the evaluation of the available capacity of the respective computing resources is an evaluation of the available capacity of those computing resources that satisfy the identified type, number, or configuration for the performance of the query.

4. The system of claim 1, wherein the at least one processor is implemented as part of a managed query service in a provider network, wherein the first network is a region of a provider network, wherein the second network is another region of the provider network, wherein the one or more computing resources are implemented as part of one or more other network-based services in the provider network, wherein the data sets are stored in a data storage service implemented as part of the provider network, and wherein the query is received from a client of the provider network.

5. A method, comprising:
 receiving, via an interface for a first network, a query directed to one or more data sets;
 in response to receiving the query:
  evaluating available capacity of computing resources hosted in the first network;
  evaluating available capacity of computing resources hosted in a second network;
  selecting computing resources hosted in the second network to perform the query instead of computing resources hosted in the first network based, at least in part, on said evaluating the available capacity of the respective computing resources hosted in the first network and the second network; and
  causing performance of the query at one or more of the selected computing resources hosted in the second network with respect to the one or more data sets.

6. The method of claim 5, further comprising:
 identifying for the performance of the query at least one of:
  a type of computing resource to perform the query;
  a number of computing resources to perform the query; or
  a configuration of computing resource to perform the query; and
 wherein the evaluation of the available capacity of the respective computing resources is an evaluation of the available capacity of those computing resources that satisfy the identified type, number, or configuration for the performance of the query.

7. The method of claim 5, wherein the evaluation of the available capacity of the respective computing resources comprises determining that the available capacity of the computing resources in the first network is insufficient to perform the query prior to evaluating the available capacity of the second network.

8. The method of claim 5, further comprising:
 obtaining execution status for the query at the first network from the one or more computing resources hosted in the second network;
 receiving, via the interface for the first network, a request for an execution status of the query; and
 responding to the request with the execution status of the query.

9. The method of claim 5, further comprising:
 in response to detecting a failure of the query at the one or more selected query resources:

selecting one or more other computing resources hosted in the first network to perform the query instead of the selected one or more computing resources hosted in the second network, based, at least in part, on another evaluation of available capacity of the respective computing resources hosted in the first network and the second network; and causing performance of the query at the selected one or more other computing resources hosted in the first network with respect to the one or more data sets.

10. The method of claim 5, wherein the first network and the second network are included in a plurality of networks, wherein the data set is stored at one or more storage resources hosted in one of the networks different than the first network, and wherein the data set is accessible to the selected one or more computing resources hosted in the second network.

11. The method of claim 5, further comprising obtaining the available capacity of the respective computing resources hosted in the first network and the second network.

12. The method of claim 11, wherein the first network and the second network are included as part of a plurality of networks, and wherein obtaining the available capacity of the respective computing resources hosted in the first network and the second network comprises receiving one or more capacity indications of the second network from one of the plurality of networks via a gossip protocol implemented amongst the plurality of networks.

13. The method of claim 5, wherein selecting computing resources hosted in the second network is based, at least in part, on a time at which the selected computing resources become available to perform the query.

14. A non-transitory, computer-readable storage medium, storing program instructions that when executed by one or more computing devices cause the one or more computing devices to implement:

receiving, via an interface for a first network, a query directed to one or more data sets;

in response to receiving the query:
evaluating available capacity of computing resources hosted in the first network;
evaluating available capacity of computing resources hosted in a second network;
selecting computing resources hosted in the second network to perform the query instead of computing resources hosted in the first network based, at least in part, on said evaluating the available capacity of the respective computing resources hosted in the first network and the second network;
causing performance of the query at one or more of the selected computing resources hosted in the second network with respect to the one or more data sets; and
providing a result of the query.

15. The non-transitory, computer-readable storage medium of claim 14, wherein the program instructions cause the one or more computing devices to further implement:
identifying for the performance of the query at least one of:
a type of computing resource to perform the query;
a number of computing resources to perform the query; or
a configuration of computing resource to perform the query; and
wherein the evaluation of the available capacity of the respective computing resources is an evaluation of the available capacity of those computing resources that satisfy the identified type, number, or configuration for the performance of the query.

16. The non-transitory, computer-readable storage medium of claim 14, wherein the data set is stored at one or more storage resources hosted in the first network, and wherein the data set is accessible to the selected one or more computing resources hosted in the second network.

17. The non-transitory, computer-readable storage medium of claim 14, wherein the first network and the second network are private networks, and wherein, in causing performance of the query at the one or more of the selected computing resources hosted in the second network, the program instructions cause the one or more computing devices to implement sending the query from the first network to the second network via a public network that connects the first network and the second network.

18. The non-transitory, computer-readable storage medium of claim 14,
wherein, in selecting computing resources hosted in a second network to perform the query, the program instructions cause the one or more computing devices to implement sending a reservation request for the one or more selected computing resources to the second network; and
wherein the program instructions cause the one or more computing devices to implement:
in response to receiving a notification from the second network indicating that the reserved computing resources are available, causing performance of the query at the selected computing resources.

19. The non-transitory, computer-readable storage medium of claim 18, wherein the first network and the second network are included as part of a plurality of networks, and wherein, in obtaining the available capacity of the respective computing resources hosted in the first network and the second network, the program instructions cause the at least one or more computing devices to implement receiving one or more capacity indications of the second network from one of the plurality of networks via a gossip protocol implemented amongst the plurality of networks.

20. The non-transitory, computer-readable storage medium of claim 14, wherein the one or more computing devices are implemented as part of a managed query service in a provider network, wherein the first network is a region of a provider network, wherein the second network is another region of the provider network, and wherein the query is received from a client of the provider network.

* * * * *